(12) United States Patent
Brdiczka et al.

(10) Patent No.: US 12,159,151 B2
(45) Date of Patent: Dec. 3, 2024

(54) INTELLIGENTLY GENERATING CLIENT DEVICE APPLICATION RECOMMENDATIONS BASED ON DYNAMIC DIGITAL USER CONTEXT STATES

(71) Applicant: Adobe Inc., San Jose, CA (US)

(72) Inventors: Oliver Brdiczka, San Jose, CA (US); Robert Alley, San Jose, CA (US); Kyoung Tak Kim, San Ramon, CA (US); Kevin Gary Smith, Lehi, UT (US); Aliakbar Darabi, New Castle, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/823,811

(22) Filed: Aug. 31, 2022

(65) Prior Publication Data
US 2022/0413881 A1    Dec. 29, 2022

Related U.S. Application Data

(63) Continuation of application No. 17/069,637, filed on Oct. 13, 2020, now Pat. No. 11,467,857.

(51) Int. Cl.
*G06F 9/451*    (2018.01)
*G06F 11/34*    (2006.01)
*G06N 20/00*    (2019.01)
*G06T 11/00*    (2006.01)

(52) U.S. Cl.
CPC .......... *G06F 9/453* (2018.02); *G06F 11/3438* (2013.01); *G06N 20/00* (2019.01); *G06T 11/00* (2013.01)

(58) Field of Classification Search
CPC ..... G06F 9/453; G06F 11/3438; G06N 20/00; G06T 11/00
See application file for complete search history.

(56) References Cited

U.S. PATENT DOCUMENTS 10,255,274 B1 *  4/2019  Schilling ................. H04L 51/06
11,038,974 B1 *  6/2021  Koukoumidis ........ G06N 5/022
(Continued)

OTHER PUBLICATIONS

U.S. Appl. No. 17/069,637, Jun. 30, 2022, Notice of Allowance.

*Primary Examiner* — Anil K Bhargava
(74) *Attorney, Agent, or Firm* — Keller Preece PLLC

(57) ABSTRACT

The present disclosure describes systems, non-transitory computer-readable media, and methods that intelligently sense digital user context across client devices applications utilizing a dynamic sensor graph framework and then utilize a persistent context store to generate flexible digital recommendations across digital applications. In one or more embodiments, the disclosed systems utilize triggers to select and activate one or more sensor graphs. These sensor graphs can include software sensors arranged according to an architecture of dependencies and subject to various constraints. The underlying architecture of dependencies and constraints in each sensor graph allows the disclosed systems to avoid race-conditions in persisting actionable user-context based signals, verify the validity of sensor output through the sensor graph, generate user-context based recommendations across multiple related applications, and accommodate a specific latency/refresh rate of context values.

20 Claims, 16 Drawing Sheets

(56) References Cited

U.S. PATENT DOCUMENTS

| | | | |
|---|---|---|---|
| 2013/0110992 A1* | 5/2013 | Ravindra | H04W 4/185 |
| | | | 709/220 |
| 2017/0109794 A1* | 4/2017 | Smith | G06Q 30/0277 |
| 2017/0140285 A1* | 5/2017 | Dotan-Cohen | G06F 9/453 |
| 2018/0014158 A1* | 1/2018 | Campbell | H04L 67/535 |
| 2018/0121432 A1* | 5/2018 | Parson | G06F 16/635 |
| 2018/0240158 A1* | 8/2018 | Peng | G06Q 30/0253 |
| 2019/0121801 A1* | 4/2019 | Jethwa | G06F 16/243 |
| 2019/0258963 A1* | 8/2019 | Guo | G06F 16/3322 |
| 2020/0219137 A1* | 7/2020 | Zhu | G06F 8/70 |
| 2020/0272914 A1* | 8/2020 | Jeyakumar | G06Q 30/02 |
| 2020/0286505 A1* | 9/2020 | Osborne | G06N 3/08 |
| 2021/0007665 A1* | 1/2021 | Cole | G16H 20/60 |

* cited by examiner

900

Identifying Digital Activity Associated With An Image Editing Application To Detect A Triggering Event 910

Identifying A Sensor Graph That Corresponds To The Triggering Event And Includes An Architecture Of Sensors With Dependency Constraints 920

Activating An Actions Sensor Of The Sensor Graph 930

Activating A Canvas Sensor Of The Sensor Graph Based On A Dependency Constraint Between The Actions Sensor And The Canvas Sensor 940

Updating A Context Store With Sensor Outputs Associated With The Actions Sensor And The Canvas Sensor 950

Generating A Digital Recommendation Based On The Updated Context Store 960

*Fig. 9*

INTELLIGENTLY GENERATING CLIENT DEVICE APPLICATION RECOMMENDATIONS BASED ON DYNAMIC DIGITAL USER CONTEXT STATES

CROSS-REFERENCE TO RELATED APPLICATIONS

The present application is a continuation of U.S. application Ser. No. 17/069,637, filed on Oct. 13, 2020. The aforementioned application is hereby incorporated by reference in its entirety.

BACKGROUND

Recent years have seen significant improvements in automatically generating in-application recommendations based on contextual cues. For example, conventional systems can detect user actions within an application and generate recommendations for tools, tutorials, and actions for the user based on the detected user actions. In some instances, conventional systems further tailor the generated recommendations based on user preferences and profile information. Despite these improvements, conventional systems suffer from a number of technical problems, particularly in relation to accuracy, efficiency, and flexibility of implementing computing devices.

BRIEF SUMMARY

One or more embodiments provide benefits and/or solve one or more of the foregoing or other problems in the art with systems, methods, and non-transitory computer readable storage media that intelligently sense digital user context across client device applications utilizing a dynamic sensor graph framework and then utilize a persistent context store to generate flexible digital recommendations across digital applications. In particular, the disclosed systems enable a unified and personalized experience across application features by capturing and aggregating user context values into a unified representation, updating them consistently as context changes, and orchestrating the required reasoning processes while appropriately taking into account dependencies and computational bandwidth available within the application.

To illustrate, in one or more embodiments the disclosed systems utilizes triggers to select and activate one or more sensor graphs. These sensor graphs can include software sensors arranged according to an architecture of dependencies and subject to various constraints. The underlying architecture of dependencies and constraints in each sensor graph allows the disclosed systems to avoid race-conditions in persisting actionable user-context based signals, verify the validity of sensor output through the sensor graph, generate user-context based recommendations across multiple related applications, and accommodate a specific latency/refresh rate of context values. Indeed, by applying sensor graphs according to an architecture of dependencies and constraints, the disclosed systems can generate and update an accurate context store that reflects a unified repository of persistent context values and outcome of associated intelligence. The disclosed systems can then utilize this context store to generate digital recommendations and a personalized experience across digital applications.

In one or more embodiments, the disclosed systems further maintain context states associated with the context store. For example, in at least one embodiment, the disclosed systems determine a context state associated with the context store based on various triggers (e.g., based on regular time intervals, based on detected user interactions). The disclosed systems can utilize the determined context states associated with the context store to provide contextual navigation features within one or more digital applications. For instance, in response to detecting backward navigation associated with a digital application (e.g., an "undo" operation), the disclosed systems can access a previously stored context state associated with the context store in order to generate digital recommendations that are accurate to (and consistent with) that context state.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIG. 9 illustrates a flowchart of a series of acts for generating a context-based digital recommendation in connection with an image editing application in accordance with one or more embodiments.

DETAILED DESCRIPTION

Figure 1:
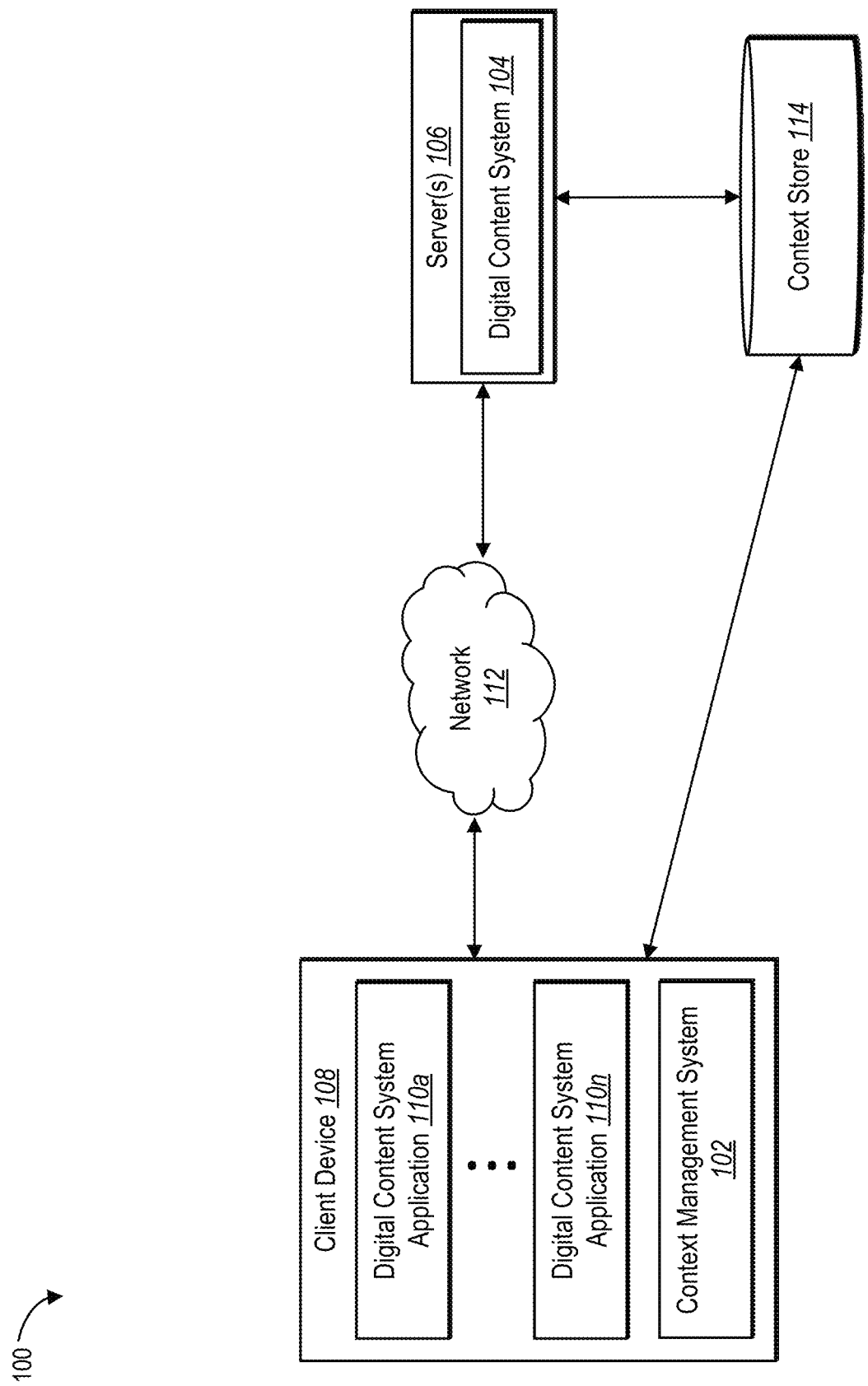
FIG. 1 illustrates a diagram of an environment in which a context management system can operate in accordance with one or more embodiments.

This disclosure describes one or more embodiments of a context management system that utilizes intelligently triggered sensor graphs of inter-dependent sensors to build a store of contextual data and that can then be utilized to generate digital recommendations (e.g., targeted, context-specific experiences) across client applications. In one or more embodiments, the sensor graphs include architectures of sensors organized according to one or more dependency constraints. For example, in response to a detected digital activity-based trigger associated with a sensor graph, the context management system sequentially activates sensors in the sensor graph based on one or more dependency constraints connecting the sensors. In at least one embodiment, the context management system further activates the sensors based on other constraints associated with timing and previously generated context values. As a result of the sequential and constrained activation of the sensors of a sensor graph, the context management system updates a context store with one or more sensor outputs from the sensor graph. In one or more embodiments, the context management system further generates recommendations based on the sensor graph and provides the generated recommendations via any of a number of client device applications.

Accordingly, the context management system can aggregate, unify and make user context actionable for features inside various desktop applications; provide a unified framework for capturing, representing, and reasoning upon user context; provide trigger-based dependency execution of reasoners within a sensor graph; and provide unified persistence of user context values. Indeed, the context management system can construct and maintain a coherent user context snapshot inside a desktop application that can be listened to and shared among all application features. In addition, the context management systems can utilize different architectures across sensor graphs with dependencies and under constraints that allow for obtaining a clean and consistent execution of a collection of sensors. As a result of interplay between sensors, sensor graphs, and the context store, the context management system can control the timed execution of sensors (i.e., computation-heavy sensors are executed in specified time intervals and with timeouts). Moreover, depending on the trigger and time interval/timeout, the context management system can control for a specific latency/refresh rate of context values. Furthermore, logic embedded in the sensor graph enables the reliable sensor performance and execution within a particular refresh rate while the validity of sensor output is verified and carried through the whole sensor graph.

Accordingly, the context management system can intelligently sense a specific context in one application to generate relevant recommendations in that or other applications. For example, the context management system can capture and persist user context signals including, but not limited to: user utterances (e.g., spoken language or typed text), user profile information (e.g., from a central repository and augmented by detecting local user behavior and user preferences), content tags (e.g., identified within an active document, file, or digital canvas), document object models (e.g., provided by an application), a document event stream (e.g., provided by an application), a document change history (e.g., provided by an application), an application event stream (e.g., including configuration changes, tool selections, etc.), and an application state (e.g., including currently selected tool or layer, tool configuration, etc.). Based on these and other user context signals, the context management system can generate one or more recommendations for search terms, help topics, tutorials, and quick-actions for the user across any of multiple applications.

To further illustrate, in one or more embodiments, the context management system utilizes a context sensing framework including sensor graph triggers, sensor graphs, and a context store associated with one or more applications. For example, the context management system monitors digital activity associated with one or more applications on a client device to detect triggering events in association with one or more sensor graph triggers. In response to detecting a sensor graph trigger, the context management system selects and activates a first sensor in a corresponding sensor graph. Based on dependency constraints between the first sensor and other sensors in the sensor graph, the context management system continues to sequentially activate the other sensors in the sensor graph.

In one or more embodiments, the context management system activates sensors in the sensor graph based on their dependency constraints. For example, the context management system activates a second sensor in the sensor graph in response to determining that a first sensor of the sensor graph has completed execution, has generated a sensor output, or that the sensor output includes a trigger corresponding to the dependency constraint between the first sensor and the second sensor. In another example, the context management system activates a third sensor in the sensor graph based on a dependency constraint between the third sensor and each of the first and second sensors. As such, the context management system activates sensors in a predetermined order in response to determining that interconnecting dependency constraints among the sensors are satisfied.

In some embodiments, the context management system further activates sensors in the sensor graph based on other constraints. For example, the context management system activates sensors based on timing constraints and update constraints. To illustrate, the context management system can activate a sensor in response to determining a timing constraint associated with that sensor is satisfied by determining that at least a threshold amount of time has passed since the same sensor was previously activated. In another example, the context management system can activate a sensor in response to determining that an update constraint associated with the sensor is satisfied by determining that an input value associated with a previous sensor has changed since the last time previous sensor was activated. Thus, in one or more embodiments, the timing constraint seeks to ensure that a particular sensor is not executed too often, and the update constraint seeks to ensure that a particular sensor is not relying on a previous sensor output that has not changed—in other words, the update constraint seeks to ensure that a sensor is executed when it will be able to generate a different or updated sensor output.

In one or more embodiments, the context management system activates various types of sensors contained within a single sensor graph. For example, the context management system can activate action sensors, canvas sensors, profile sensors, experience state sensors, and recommendation sensors. In at least one embodiments, action sensors generate outputs based on detected user interactions. Similarly, canvas sensors generate outputs associated with features of a digital image canvas. Profile sensors generate outputs associated with user profile information. Experience state sensors generate outputs associated with an application state or a user state within the application. And recommendation sensors generate recommendations based on a particular detected context.

In at least one embodiment, the context management system updates the context store with sensor outputs in order to generate a centralized repository of aggregated user context values. For example, each sensor of an activated sensor graph includes one or more executable operations or routines that outputs contextual information and/or recommendations associated with how a user is currently interacting with one or more applications. Thus, as the context management system activates sensors in a sensor graph, the context management system also builds an accurate context store that the same or other applications can access to generate user recommendations that are specific to the current context. For instance, the context management system can access the context store to generate recommendations for a second application based on sensor outputs associated with user interactions with a first application.

In one or more embodiments, the context management system further determines context states associated with the context store. For example, based on detection of a predefined trigger (e.g., passage of a regular time interval, detecting a particular user interaction, detecting a particular sensor output), the context management system can generate and store a context state (e.g., a "snapshot") of the context store. For instance, the context management system can determine a context state associated with the context store that includes one or more sensor output values at a particular point in time.

The context management system can further store the determined context state for use in connection with later navigation within one or more applications. For instance, the context management system can store one or more context states associated with the context store such that, in response to a navigation event (e.g., a detected "undo" operation, a selection of a backwards navigation button), the context management system can identify a context state that correlates to the point in time associated with the navigation event (e.g., an immediately previous context state, a context state from five minutes ago). The context management system can then generate one or more digital recommendations based on the sensor outputs contained within the identified context state. Thus, in at least one embodiment, the context management system can generate digital recommendations that are accurate to a user's context, even in response to one or more navigation events such as multiple selections of a "back" button or "forward" button.

Although conventional systems can generate recommendations, such systems typically generate inaccurate recommendations that fail to capture a user's true context. For example, conventional systems operate on an event subscription model where application features can subscribe to events that originate an application. Accordingly, through this event subscription model, conventional systems detect events (typically via the user interface) that trigger the execution of various processes in order to generate user recommendations. But, in conventional systems, the execution of these recommendation processes is rarely in an order that can be controlled, and often relies on signals that are not current. This, in turn, leads to race-conditions where conventional systems generate outputs based on incorrect inputs. By further relying on these outputs, conventional systems generate recommendations that are accurate and often non-sensical to the user because the recommendations are related to things that the user is not currently doing within the application. In sum, conventional approaches fail to consistently aggregate user context values or accurately orchestrate reasoning processes.

This haphazard execution common to conventional systems gives further rise to computational inefficiencies. For example, in certain digital environments (such as those in connection with digital image editing) some recommendation processes run against a digital canvas in order to perform facial recognition, object tagging, and more. But these (or similar) types of operations are computationally intensive; utilizing large amounts of system resources during execution. By executing these types of modules unnecessarily (or in the wrong order), conventional systems not only waste system resources, but also slow implementing computing devices.

Moreover, conventional systems are rigidly tied to generating recommendations in a single application. For example, a conventional system may be able to detect user signals in an application and provide a recommendation for further user action within that application. But conventional systems fail to provide a flexible recommendation solution across related applications where user actions in one application may affect a potential recommendation in a related application.

As mentioned above, the context management system provides many advantages and benefits over conventional systems and methods. For example, the context management system improves the accuracy of implementing computing systems in determining current digital context and generating automatic, context-based recommendations. In contrast to the event subscription model describe with regard to conventional systems, the context management system sequentially activates sensors within a context sensing framework (i.e., a sensor graph) based on dependency constraints. These and other constraints ensure that the context management system avoids the inaccuracies and race-conditions common to conventional systems because the context management system activates sensors in a particular order while verifying correct and up-to-date inputs. Indeed, the context management system can construct and maintain an accurate and coherent context snapshot that can be analyzed and shared among all application features.

By utilizing the architectures of sensors within the sensor graphs of the context sensing framework, the context management system further avoids the computational inefficiencies common to conventional systems. As an initial matter, the sensor graphs and associated constraints allow for a clean and consistent execution of sensors, which itself results in significant efficiency gains (by avoiding unnecessary, duplicative, or conflicting processes). In addition, the context management system utilizes the constraints mentioned above to obtain appropriate activation of computationally heavy sensors (such as canvas sensors that include neural networks or other machine learning models). Indeed, the context management system can avoid executing computationally expensive processes unless warranted based on dependency constraints, the output of previous sensors in the sensor graph, timing constraints, and/or update constraints. Moreover, as a result of the interplay between triggers, sensors, sensor graphs, and a context store, the context management system can efficiently control for a specific latency/refresh rate of context values.

Moreover, the context management system provides a flexible context-sensing solution that can be utilized in connection with a suite of applications. For example, as mentioned above, the context management system updates a centralized context store with recommendations and user context values based on sensor outputs of a sensor graph associated with a particular application. The context management system can then utilize the values in the context store to generate recommendations for other applications. Thus, while conventional systems are restricted to generating recommendations for a single application based on user interactions in connection with that application, the context management system can generate recommendations for a second application based on user interactions in connection with a first application. Accordingly, the recommendation maintains updated context across applications to provide a global and coherent contextually-based solution.

Additional detail regarding the context management system will now be provided with reference to the figures. For example, FIG. 1 illustrates a schematic diagram of an example system environment 100 (e.g., the "environment" 100) for implementing context management system 102 in accordance with one or more embodiments. Thereafter, a more detailed description of the components and processes of the context management system 102 is provided in relation to the subsequent figures.

As shown in FIG. 1, the environment 100 includes server(s) 106, the client device 108, and a network 112. Each of the components of the environment 100 can communicate via the network 112, and the network 112 may be any suitable network over which computing devices can communicate. Example networks are discussed in more detail below in relation to FIG. 11.

As mentioned, the environment 100 includes the client device 108. The client device 108 can be one of a variety of computing devices, including a smartphone, tablet, smart television, desktop computer, laptop computer, virtual reality device, augmented reality device, or other computing device as described in relation to FIG. 11. In some embodiments, the environment 100 can include any number or arrangement of client devices, each associated with a different user. The client device 108 can further communicate with the server(s) 106 via the network 112.

As shown in FIG. 1, the client device 108 includes the context management system 102. In one or more embodiments, and as will be discussed in greater detail below, the context management system 102 detects context-based signals from one or more of digital content system applications 110a-110n in order to maintain an accurate and consistent user state representation in a context store 114. For example, the context management system 102 can activate sensors to store, update, and maintain various sensor outputs in the context store 114 that can, in turn, be accessed and utilized by one or more of the digital content system applications 110a-110n to provide user context-based features to a user of the client device 108. Although FIG. 1 depicts the context management system 102 located on the client device 108, in some embodiments, the context management system 102 may be implemented by (e.g., located entirely or in part) on one or more other components of the environment 100. For example, the context management system 102 may be implemented in whole or in part by the server(s) 106. Similarly, it will be appreciated that the context store 114 can be implemented at the client device 108 and/or the server(s) 106.

For example, in at least one embodiment, components of the context management system 102 can be maintained and implemented by the client device 108. To illustrate, in at least one embodiment, the context management system 102 may be compiled into an application installed on the client device 108. For instance, the context management system 102 and its components may be compiled into the digital content system application 110a. In that embodiment, other applications (e.g., the digital content system application 110n) may also access the context store 114 maintained by the digital content system application 110a.

As shown in FIG. 1, the client device 108 can include one or more digital content system applications 110a-110n. In one or more embodiments, each of the digital content system applications 110a-110n provide different functionality in connection with a digital content system 104. For example, the digital content system application 110a may enable the user to create and edit digital photograph-based digital content items, while the digital content system application 110n may enable the user to create and edit vector-based digital content items. As will be discussed in greater detail below, each of the digital content system applications 110a-110n can provide user context-based features (e.g., tutorial recommendations, tool recommendations) that the context management system 102 generates based on values maintained by a context store 114. Although the digital content system applications 110a-110n discussed herein are related to each other via the digital content system 104, in other embodiments, the applications 110a-110n may be unrelated. For example, in one embodiment, the application 110a may be a web browser, while the application 110n may be a text editor or a digital video editing application.

More broadly, in one or more embodiments, the digital content system applications 110a-110n are client device applications that can include a variety of different applications installed on a client device. In one or more embodiments, a client device application can receive user input (e.g., keystroke inputs via a keyboard, user interaction inputs via a touch screen, track pad, or mouse). Additionally, a client device application can generate one or more graphical user interfaces to display information. To illustrate, a client device application can include a digital image editing application, a digital video editing application, a vector image editing application, a webpage design application, a web browser, a word processing application, or another software application. In at least one embodiment, a client device can include multiple related client device applications. For example, a user of the client device can utilize a single login in connection with the multiple related client device application on the client device.

As further illustrated in FIG. 1, the environment 100 includes the server(s) 106. The server(s) 106 may include one or more individual servers that may generate, store, receive, and transmit electronic data. For example, the server(s) 106 may receive data from the client device 108 in the form of a user input, such as a keystroke stream or an event stream.

As further shown in FIG. 1, the server(s) 106 can also include the digital content system 104. In one or more embodiments, the digital content system 104 stores, provides, and maintains digital content items across one or more applications. For example, the digital content system 104 can further provide tools and routines by which a user can create, edit, modify, and enhance digital content items via the one or more applications. To illustrate, the digital content system 104 can enable a user to create a digital content item that includes text configured via a first application and images edited via a second application. The digital content system 104 can store and maintain the digital content item and its component parts separately or in a single digital content item repository.

Figure 2:
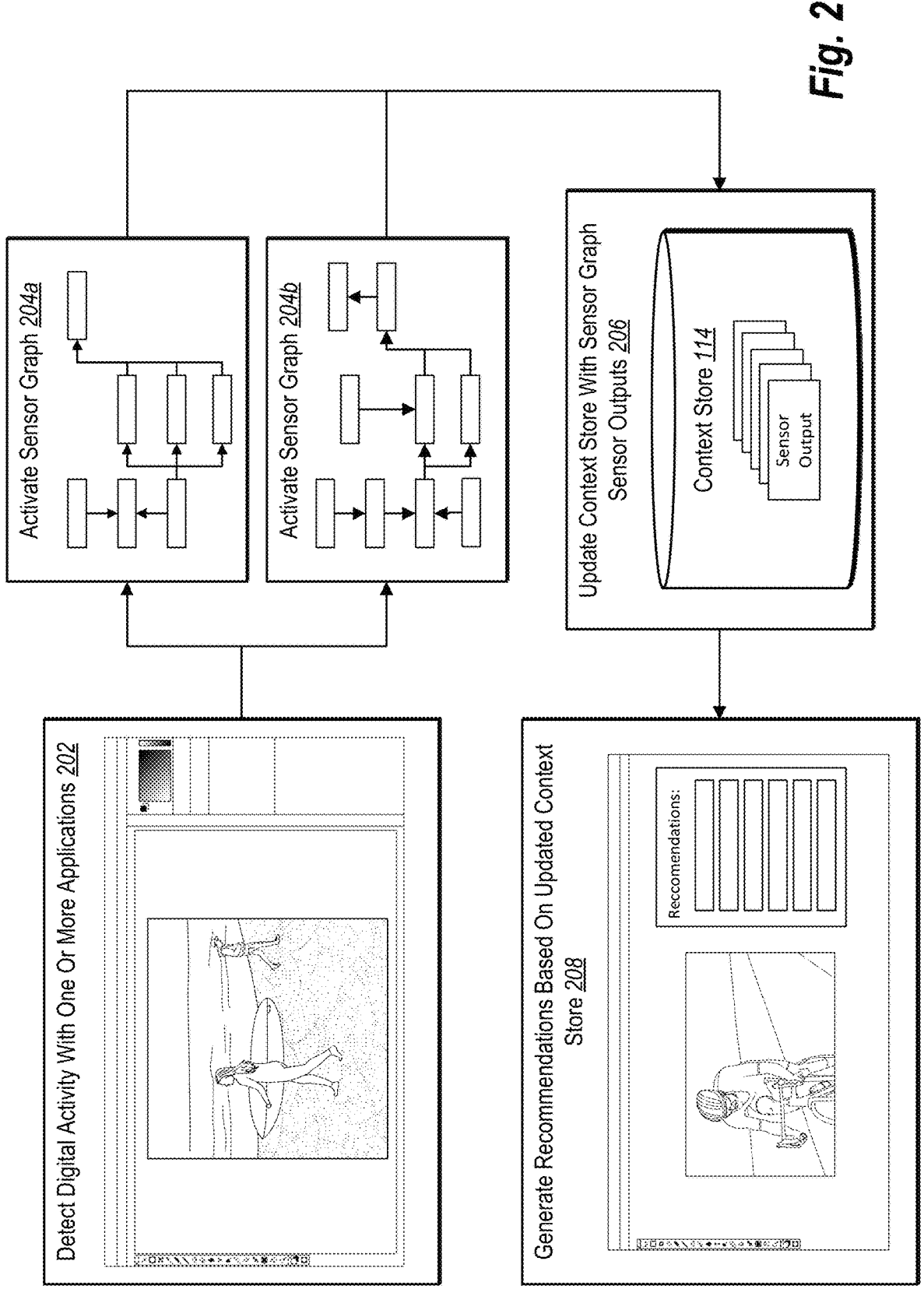
FIG. 2 illustrates a diagram of the context management system generating one or more user-context based recommendations in accordance with one or more embodiments.

FIG. 2 illustrates an example overview of the context management system 102 intelligently determining user context-based values in connection with the digital content system application 110a on the client device 108 and generating a user context-based recommendation based on the determined values. As shown in FIG. 2, the context management system 102 can detect digital activity with one or more applications on the client device 108 (as shown in an act 202). In one or more embodiments, the context management system 102 can detect the digital activity based on detected user interactions with the digital content system application 110a, and/or by receiving one or more event streams (e.g., a keystroke stream, a click stream) from the digital content system application 110a. The detected and monitored digital activity can include application actions such as opening and closing the digital content system application 110a. The monitored digital activity can also include digital content actions such as opening, closing, creating, saving, and modifying a digital content item.

In more detail, digital activity can include a variety of types of client devices processes or user interactions with a client device application on a client device. For instance, digital activity can include initiating a client device application, closing a client device application, and/or running a sub-process within a client device application. In one or more embodiments, digital activity can be keystrokes received by the client device application from a keyboard of the client device. Digital activity can also be touch gesture interaction received by the client device application from a trackpad, touch screen, and/or mouse associated with the client device. To illustrate, digital activity can include a user selection of a tool, a menu, a file, a digital item, or a tutorial. Digital activity can also include a user input of a search term.

The context management system 102 can further activate one or more sensor graphs (as shown in acts 204a, 204b). For example, the context management system 102 can identify one or more triggering events in the monitored digital activity that corresponds to one or more sensor graph triggers. In response to identifying the one or more triggering events, the context management system 102 can activate the corresponding one or more sensor graph triggers. In one or more embodiments, the context management system 102 triggers a sensor graph by identifying the sensor graph associated with the activated sensor graph trigger, and activating at least a first sensor in the identified sensor graph. As mentioned above, a sensor graph includes an architecture of one or more sensors that are associated with each other via various dependency constraints that dictate the order in which the context management system 102 can activate the sensors in order to generate various sensor outputs.

Once the context management system 102 identifies the sensor graphs that corresponds with the one or more sensor graph triggers, the context management system 102 can activate one or more of the sensors in the identified sensor graph. For example, in at least one embodiment, the context management system 102 can activate a first sensor in the sensor graph based on its dependency constraint associated with the sensor graph trigger. In one or more embodiments, the context management system 102 activates sensors based on their dependency constraints, and also based on other constraints. For instance, and as will be discussed in greater detail below with regard to FIG. 4A, the context management system 102 can activate a sensor in response to determining that both its dependency constraint and its timing constraint are satisfied. In another example, and as will be discussed in greater detail below, the context management system 102 can activate a sensor in response to determining that both its dependency constraint and its timing and update constraints are satisfied.

As the context management system 102 activates one or more sensors of the sensor graph, the context management system 102 updates a context store with sensor graph sensor outputs (as shown in an act 206). For example, in one or more embodiments, the context management system 102 can add a new sensor output to the context store (e.g., the context store 114) associated with a previously not-executed sensor. The context management system 102 can also update an existing sensor output associated with a sensor that has been previously executed. In at least one embodiment, the context management system 102 add or updates a sensor output in the context store by adding or updating a sensor output value, a timestamp associated with the update, and an update signal indicating whether a current sensor output value is different from a previously stored sensor output value.

Based on the updated context store, the context management system 102 can generate recommendations for the user of the client device 108 (as shown in an act 208). For example, the context management system 102 can generate a recommendation for the user to watch a particular tutorial, to use a specific tool, apply a certain effect, or run a particular routine. Moreover, the context management system 102 can provide generated recommendations in connection with a second digital content system application 110n. In this way, the context management system 102 can generate a recommendation that is accurate to the user's current context in relation to one or more digital content items based on the sensor outputs of the sensor graph.

Figure 3:
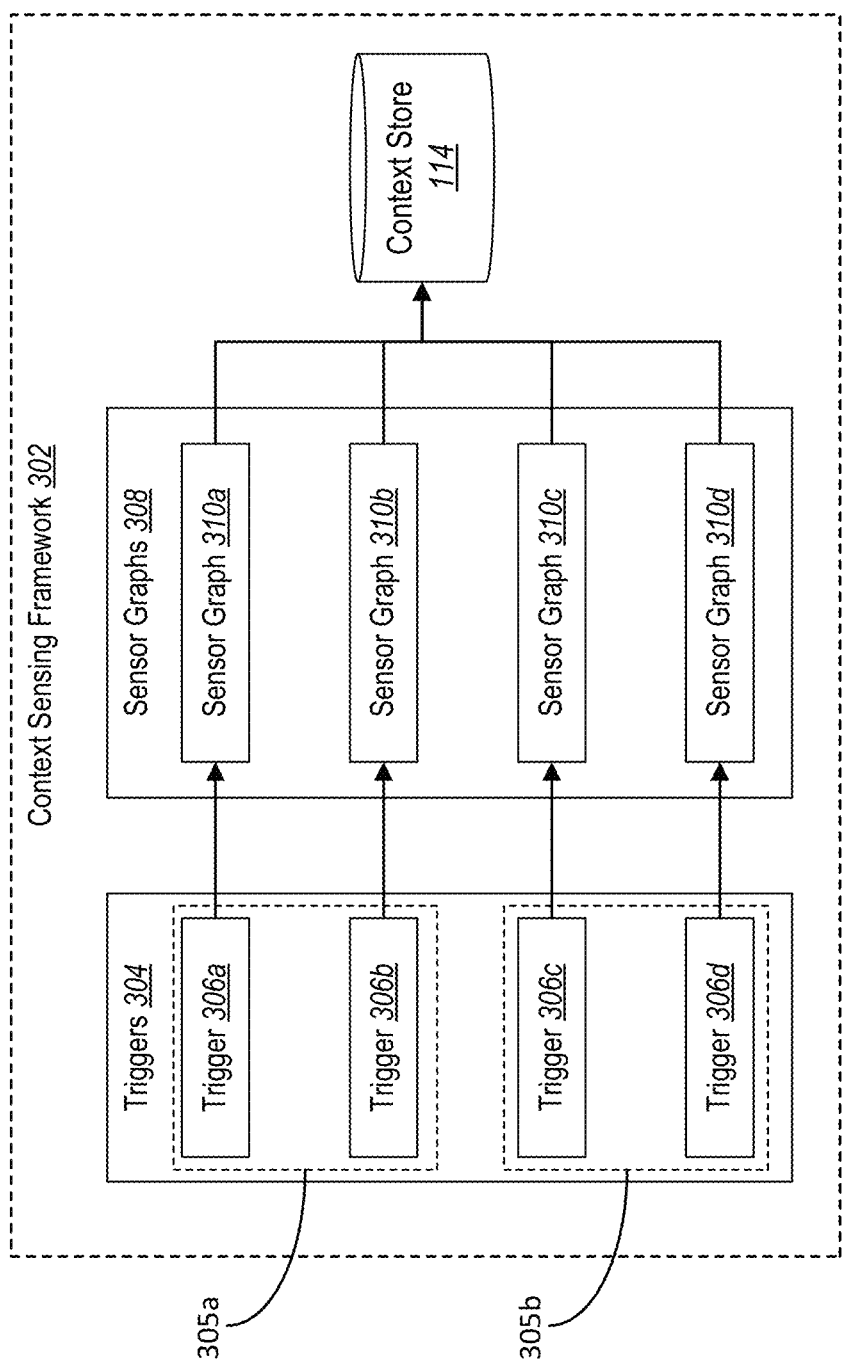
FIG. 3 illustrates a diagram of a context sensing framework in accordance with one or more embodiments.

FIG. 3 illustrates an example overview of a context sensing framework utilized by the context management system 102 in activating sensor graphs based on constraints in order to update and maintain user context data. The context sensing framework 302 can be a digital framework of one or more event listeners, software modules, and data repositories that are connected to each other via dependencies. For example, as shown in FIG. 3, a context sensing framework 302 includes a trigger repository 304, a sensor graph repository 308 and the context store 114. As further shown, the trigger repository 304 includes sensor graph triggers 306a, 306b, 306c, 306d, which the sensor graph repository 308 including the sensor graphs 310a, 310b, 310c, 310d. Although FIG. 3 shows the sensor graph triggers 306a-306d, and the sensor graphs 310a-310d, additional embodiments, can include any number of sensor graph triggers and sensor graphs. Additionally, although FIG. 3 shows a one-to-one correlation between the sensor graph triggers 306a-306d and the sensor graphs 310a-310d, other embodiments can include sensor graph triggers that correspond to two or more sensor graphs, and sensor graphs that correspond to two or more sensor graph triggers.

For example, a sensor graph trigger can include software that monitors digital activity, processing threads, system calls, and other software events for predefined outcomes or outputs. In one or more embodiments, a sensor graph trigger is a script that subscribes to, captures, or otherwise listens for a particular triggering event. For example, a triggering event can include a predefined system action or user input that is associated with a particular sensor graph trigger. In response to capturing or otherwise detecting the triggering event, a sensor graph trigger can activate a specific sensor graph. To illustrate, a sensor graph trigger can listen for triggering events such as, but not limited to, opening or initializing a client device application, selecting a tool, applying a tool to a canvas, entering a search term, requesting a tutorial, and so forth.

Moreover, a sensor graph can include any number of sensors. For example, a sensor graph can include a collection or architecture of one or more sensors. In one or more embodiments, a sensor graph can include the one or more sensors sequentially connected to each other via one or more types of constraints. To illustrate, a sensor graph can include a first sensor and a second sensor, where the second sensor activates based on a dependency constraint corresponding to the first sensor.

In one or more embodiments, the context management system 102 can identify, load, and otherwise utilize the context sensing framework 302 in response to detecting the initialization, activation, or opening of one or more client device applications. For example, in response to detecting the initialization of the digital content system application 110a on the client device 108, the context management system 102 can identify and load the context sensing framework 302. To illustrate, the context management system 102 can identify all sensor graph triggers associated with the trigger repository 304, and all the sensor graphs associated with the sensor graph repository 308.

Additionally, as part of loading the context sensing framework 302, the context management system 102 can further initialize one or more of the sensor graph triggers 306a-306d. In one or more embodiments, one or more of the sensor graph triggers 306a-306d are event "listeners" that perform certain functions in response to a specific detected event. For example, a sensor graph trigger 306a may be script that subscribes to or captures a source event in one or more applications. To illustrate, the sensor graph trigger 306a may be a module that activates the sensor graph 310a in response to detecting a user selection of a particular feature within the digital content system application 110a on the client device 108. In at least one embodiment, each of the sensor graph triggers 306a-306d activate the sensor graphs 310a-310d, respectively, in response to different detected events.

As further shown in FIG. 3, the context management system 102 activates each of the sensor graphs 310a-310d to store and/or update sensor graph sensor outputs to the context store 114. For example, a context store (e.g., the context store 114) can include a data repository of sensor outputs. In one or more embodiments, a context store is a data memory that organizes and maintains sensor outputs where each sensor output is associated with a value, a timestamp, and an update signal. While one or more sensor graphs can write to and read from the context store, other applications (e.g., the digital content system application 110a and the digital content system application 110n) may read from the context store in order to generate one or more digital recommendations.

For example, a digital recommendation can be a targeted user interface element based on a determined context (corresponding to a user of a client device). In one or more embodiments, a digital recommendation can include a user interface customization targeted to a particular user based on sensor outputs in the context store. To illustrate, the context management system 102 can utilize the context-based sensor outputs of the context store to generate user interface customizations including tutorial suggestions, search query responses, suggested actions, and/or recommended tools. In at least one embodiment, the context management system 102 can further generate a digital recommendation that changes the display of existing elements of a user interface (e.g., changes the order of a list of recommended tools or tutorials).

For example, and as mentioned above, the context management system 102 can utilize the sensor outputs from one or more of the sensor graphs 310a-310d to determine context-based recommendations across one or more applications on the client device 108. As will be discussed in greater detail below with regard to FIG. 4A, a sensor graph can include an architecture of sensors that is correlated with one or more sensor graph triggers. For example, a sensor graph can include one or more sensors that are connected by one or more constraints.

In one or more embodiments, some sensor graph triggers in the trigger repository 304 may be associated with or subscribed to a first digital content system application 110a, while other sensor graph triggers in the trigger repository 304 may be associated with or subscribed to a second digital content system application 110n. For example, the sensor graph triggers 306a and 306b may be associated with the first digital content system application 110a (e.g., indicated by the dashed-line box 305a), while the sensor graph triggers 306c and 306d may be associated with the second digital content system application 110n (e.g., indicated by the dashed-line box 305b). In additional or alternative embodiments, the trigger repository 304 can include any number of sensor graph triggers, and the sensor graph triggers may all be associated the application, or may each be associated with a different application. Alternatively, the trigger repository 304 may include a collection of sensor graph triggers where one sensor graph trigger is associated with a first application, and multiple additional sensor graph triggers are associated with a second application, and so forth. In this way, the context management system 102 can execute various sensor graphs based on triggering events associated with multiple applications on the client device 108.

Figure 4A:
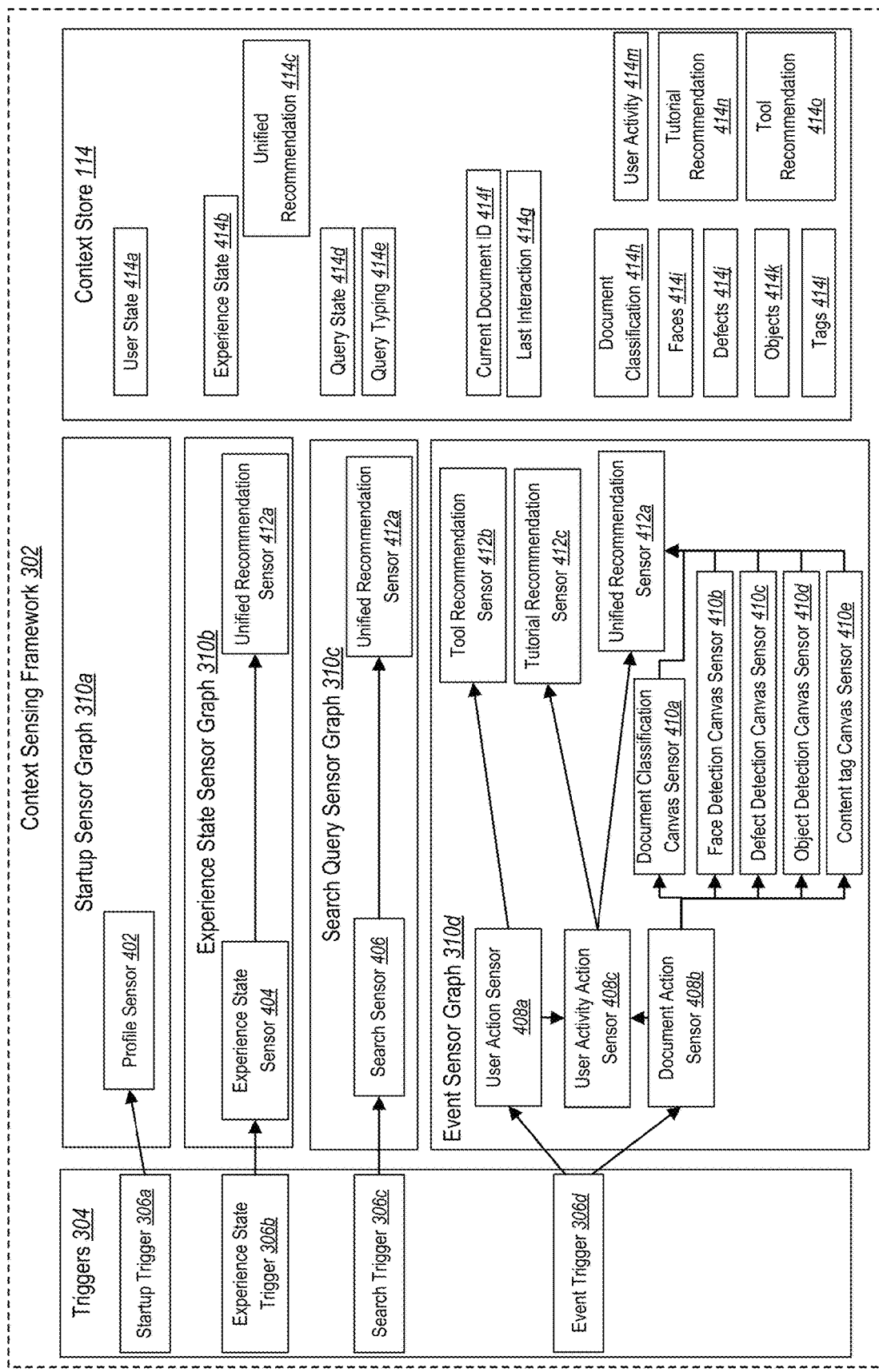
FIGS. 4A-4B illustrate schematic diagrams of the context sensing framework and one or more sensor constraints relative to a context store in accordance with one or more embodiments.

FIG. 4A illustrates further detail with regard to the context sensing framework 302. For example, as shown, the sensor graph triggers 306a-306d can be specific to various types of triggering events. More specifically, the sensor graph trigger 306a is a startup trigger. In one or more embodiments, the context management system 102 activates the sensor graph trigger 306a in response to detecting the opening, activation, or initialization of a specific application (e.g., the digital content system application 110a). Additionally or alternatively, the context management system 102 can activate the sensor graph trigger 306a in response to detecting that all the features and functionality of the digital content system application 110a are loaded and operational.

As further shown in FIG. 4A, the sensor graph trigger 306b is an experience state trigger. In one or more embodiments, the context management system 102 activates the sensor graph trigger 306b in response to detecting a change to the current user's experience state within the digital content system application 110a. For example, as will be described in greater detail below with regard to FIGS. 5A-5D, the user's experience state can change in response to a detected change in display focus (e.g., changing from one user interface to another user interface, changing from one canvas to another canvas). In at least one embodiment, the user's experience state changes in response to a detected change in focus of a recommendation display or recommendation tool within the digital content system application 110a. Thus, the context management system 102 can activate the sensor graph trigger 306b in response to determining that the recommendation display or tool has focus within the digital content system application 110a, or that the user has selected a different experience option (e.g., "Interactive Tutorials," "Actions," "Tools," "Keyboard Shortcuts") within the recommendation display.

As further shown in FIG. 4A, the sensor graph trigger 306c is a search trigger. In one or more embodiments, the context management system 102 activates the sensor graph trigger 306c in response to determining that the user is typing or submitting a search query in connection with one or more applications. For example, the recommendation display mentioned above can include a search query input box in connection with the digital content system application 110a. Thus, the context management system 102 can activate the sensor graph trigger 306c in response to determining that the user is entering a search query via the search query input box, or is submitting a search query via the search query input box.

As further shown in FIG. 4A, the sensor graph trigger 306d is an event trigger. In one or more embodiments, the context management system 102 activates the sensor graph trigger 306d in response to detecting events associated with the digital content system application 110a once it is loaded (e.g., by analyzing an event stream from the digital content system application 110a). For example, the context management system 102 can activate the sensor graph trigger 306d in response to detecting user interactions that cause the digital content system application 110a to open and load a file, digital content item, or digital canvas. Similarly, the context management system 102 can activate the sensor graph trigger 306d in response to detecting user interactions in connection with an opened file, digital content item, or digital canvas. To illustrate, the context management system 102 can activate the sensor graph trigger 306d in response to detecting a user selection of a brush tool to use in connection with a digital content item. The context management system 102 can activate the sensor graph trigger 306d in response to detecting user interactions that cause the digital content system application 110a to close, save, export, or share a file, digital content item, or digital canvas.

As mentioned above, in response to detecting a triggering event that activates a sensor graph trigger, the context management system can identify a sensor graph that corresponds to the activated sensor graph trigger. As shown in FIG. 4A, the sensor graphs 310a-310d are each associated with different sensor graph triggers. As further shown in FIG. 4A, each of the sensor graphs 310a-310d include various architectures of sensor graphs. The architectures of sensor graphs can include a single sensor (e.g., as with the sensor graph 310a), or may include multiple sensors with complex dependency constraints (e.g., as with the sensor graph 310d).

More specifically, a constraint can be a rule, heuristic, requirement, or throttle associated with a sensor within a sensor graph. In one or more embodiments, the context management system activates a sensor in response to determining that the one or more constraints associated with the sensor are satisfied. In more detail, a constraint may be a dependency constraint, a timing constraint, or an update constraint.

For example, a dependency constraint can be a rule associated with a sensor that is satisfied based on the activation, and/or output of a previous sensor. To illustrate, a dependency constraint associated with a particular sensor may be satisfied in response to: one or more previous sensors having completed activation, one or more previous sensors having generated sensor outputs, or one or more previous sensor outputs including a trigger corresponding to the dependency constraint.

Additionally, a timing constraint can be a rule associated with a sensor that is satisfied based on an amount of time that has passed since the last time the same sensor was previously activated. To illustrate, a timing constraint associated with a sensor may be satisfied in response to determining that the difference between the current time and a timestamp associated with a previous output associated with the sensor is equal to or greater than a threshold amount of time.

Moreover, an update constraint can be a rule associated with a sensor that is satisfied based on the input to the sensor having changed since the last time the same sensor was previously activated. To illustrate, an update constraint associated with a current sensor may be satisfied in response to determining that the input to the current sensor (e.g., a sensor output from a previous sensor that is sequentially connected to the current sensor) changed in the most recent activation of the previous sensor.

A sensor can include a software module, a script, or another type of computer instruction that determines or senses information regarding a client application or user utilizing a client application. In one or more embodiments, a sensor can query a value, calculate a result, process an algorithm, and/or generate one or more outputs regarding a user context corresponding to a client application. For example, a sensor can include an action sensor, a canvas sensor, a recommendation sensor, a profile sensor, or an experience state sensor.

To illustrate, an action sensor can generate output indicating a user activity, activity class, or a digital document activity state corresponding to a client application. Thus, an action sensor can include a user action sensor, user activity action sensor (e.g., an activity class sensor), and document action sensor. For instance, a user action sensor can determine a user activity (e.g., click of a tool) and a user activity action sensor can determine an activity class (e.g., "cleaning up a photograph" or "drawing a vector image). A document action sensor can further determine a digital document activity state, such as opening, closing, saving, or exporting a file/digital document.

Additionally, a canvas sensor can determine information corresponding to a digital canvas of a client application. For example, a canvas sensor can determine a number of faces portrayed in a digital photograph on a digital canvas, object tags associated with object portrayed in a digital canvas, a number and type of defects present in a digital canvas, and so forth. A recommendation sensor can generate one or more context-based recommendation corresponding to a client application. For example, a recommendation sensor can generate a context-based recommendation for a particular tool, a particular tutorial, a particular quick action, a particular search term, and so forth.

A profile sensor can determine profile information corresponding to a user of a client application. For example, profile sensor can determine a user's account number, preferences, and use history in association with a profile. An experience state sensor generates one or more outputs associated with an application state or a user state within a client application. For example, as an application presents different active panels or user interfaces the experience state sensor can determine the different experience states (e.g., editing panel versus search panel).

A sensor output can include a variety of types of data output. In one or more embodiments, a sensor output can include one or more values such as, but not limited to, one or more numerical values, one or more character strings, one or more memory pointers, or other type of output. In at least one embodiment, a sensor output is also associated with a timestamp, and one or more update signals indicating whether a value associated with the sensor output changed in a most recent activation of the corresponding sensor.

The context management system 102 executes one or more sensor graphs 310a-310d based on the constraints associated with the sensors in each sensor graph. Additional detail regarding these constraints is provided in greater detail below (e.g., in relation to FIB. 4B). In some embodiments, however, a sensor graph may only include a single sensor. For example, in response to detecting a triggering event corresponding to the startup sensor graph trigger 306a, the context management system 102 can activate a profile sensor 402 of the sensor graph 310a (e.g., the startup sensor graph). In one or more embodiments, the profile sensor 402 includes one or more software modules, scripts, and/or instructions that queries user profile information from a user profile repository associated with the digital content system 104. For instance, the profile sensor 402 can query the user profile repository to generate a sensor output including a digital content system account identifier associated with the user of the client device 108, preferences associated with the user of the client device 108, and application use history associated with the digital content system applications 110a-110n installed on the client device 108. The context management system 102 can store the sensor output of the profile sensor 402 in the context store 114 as the user state output 414a.

While the startup sensor graph 310a includes only a single profile sensor 402, other sensor graphs can include multiple sensors. For example, in response to detecting a triggering event corresponding to the experience state sensor graph trigger 306b, the context management system 102 can activate an experience state sensor 404 in the sensor graph 310b (e.g., the experience state sensor graph). In one or more embodiments, the experience state sensor 404 includes one or more software modules, scripts, and/or instructions that determine the current experience state associated with the digital content system application 110a. In at least one embodiment, the experience state sensor 404 determines the current experience state associated with the digital content system application 110a. For example, the experience state sensor 404 can determine the current experience state associated with the digital content system application 110a by determining one or more active displays and/or user interfaces associated with the digital content system application 110a. In at least one embodiment, the experience state sensor 404 determines the current experience state associated with the digital content system application 110a by determining an active module or focus of a recommendation tool provided via the digital content system application 110a.

For example, and as will be discussed in greater detail below with regard to FIGS. 5A-5C, the recommendation tool includes front-end interactive elements associated with various software modules that perform different tasks. To illustrate, the recommendation tool can be associated with a search module, a help module, a tutorial module, and a quick-action module. By detecting user interactions in connection with the recommendation tool, the experience state sensor 404 can generate a sensor output by determining which of the associated modules is active or has focus. The context management system 102 can then store the sensor output in the context store 114 as the experience state sensor output 414b.

Additionally, depending on the determined experience state, the experience state sensor 404 can generate additional sensor outputs associated with the query state sensor output 414d and the query typing sensor output 414e. For example, the experience state sensor 404 can output sensor values associated with the query state sensor output 414d and the query typing sensor output 414e in response to determining that the recommendation tool is focused on the search module and that the user is inputting or has input a search query. If the recommendation tool is not focused on the search module, the experience state sensor 404 can leave the query state sensor output 414d and the query typing sensor output 414e un-updated.

As further shown in FIG. 4A, the architecture of sensors in the sensor graph 310b (e.g., the experience state sensor graph) includes a unified recommendation sensor 412a. In one or more embodiments, the context management system 102 activates the unified recommendation sensor 412a in response to determining that one or more constraints associated with the unified recommendation sensor 412a have been satisfied. For example, the context management system 102 can determine whether a dependency constraint associated with the unified recommendation sensor 412a is satisfied. As discussed above with reference to FIG. 4B, the context management system 102 determines that the dependency constraint associated with the unified recommendation sensor 412a is satisfied by determining that: one or more previous sensors have completed activation, one or more previous sensors have generated sensor outputs, or that one or more previously generated sensor outputs associated with previous sensors include a trigger corresponding to the dependency constraint. For instance, the context management system 102 can determine that the dependency constraint associated with the unified recommendation sensor 412a is satisfied by determining that the experience state sensor 404 has completed activation, has generated a sensor output (e.g., the experience state sensor output 414b), or that the generated sensor output includes a trigger corresponding to the dependency constraint between the experience state sensor 404 and the unified recommendation sensor 412a.

Additionally, the context management system 102 can determine whether additional constraints associated with the unified recommendation sensor 412a are satisfied. For example, as discussed above, the context management system 102 can determine that a timing constraint is satisfied by determining a difference between the current time and a timestamp associated with the sensor output of the unified recommendation sensor 412a in the context store 114. Accordingly, the context management system 102 can determine that the timing constraint associated with the unified recommendation sensor 412a is satisfied if there is at least a threshold amount of time between the timestamp associated with the unified recommendation sensor output 414c and the current time. If there is not at least a threshold amount of time between the timestamp associated with the unified recommendation sensor output 414c and the current time, the context management system 102 will not activate the unified recommendation sensor 412a.

Additionally, the context management system 102 can determine that an update constraint associated with the unified recommendation sensor 412a is satisfied. As discussed above, in order to save computing resources and promote efficiency, the context management system 102 does not activate a particular sensor if the inputs to that sensor have not changed since the last time that sensor was activated. For example, the context management system 102 can determine that the update constraint associated with the unified recommendation sensor 412a is satisfied in response to determining that the sensor output of the experience state sensor 404 changed between its most recent activation and a previous activation. Thus, the context management system 102 can determine that the update constraint associated with the unified recommendation sensor 412a is satisfied by identifying the update signal associated with the experience state sensor output 414b, and determining that the update signal indicates that the experience state sensor output 414b was indeed changed in the last activation of the experience state sensor 404.

In response to determining one or more constraints associated with the unified recommendation sensor 412a are satisfied, the context management system 102 can activate the unified recommendation sensor 412a. In one or more embodiments, the unified recommendation sensor 412a includes one or more software modules, scripts, and/or instructions that generate a recommendation in connection with the digital content system application 110a. For example, the unified recommendation sensor 412a can utilize one or more sensor outputs in the context store 114 (e.g., including the experience state sensor output 414b) in connection with a trained recommendation machine learning model to generate a recommendation that is accurate to the user's detected interaction with both the digital content system application 110a and the recommendation tool discussed above. The context management system 102 can update the unified recommendation sensor output 414c with the sensor output of the unified recommendation sensor 412a. As mentioned above, the context management system 102 can further update a timestamp and an update signal associated with the unified recommendation sensor output 414c.

In response to detecting a triggering event corresponding to the search sensor graph trigger 306c, the context management system 102 can activate a search sensor 406 in the sensor graph 310c (e.g., the search query sensor graph). In one or more embodiments, the search sensor 406 includes one or more software modules, scripts, and/or instructions that detect information associated with a search query associated with the digital content system application 110a. For example, the search sensor 406 can determine whether a search query is being input, and if so, what the search query includes. In at least one embodiment, the search sensor 406 makes this determination in connection with the recommendation tool mentioned above. The search sensor 406 can generate one or more sensor outputs associated with one or more of the query state sensor output 414d, the query typing sensor output 414e, and the experience state sensor output 414b.

As further shown in FIG. 4A, the architecture of sensors in the sensor graph 310c (e.g., the search query sensor graph) includes the unified recommendation sensor 412a. As discussed above, the context management system 102 activates the unified recommendation sensor 412a in response to determining that one or more of dependency constraints, timing constraints, and update constraints associated with the unified recommendation sensor 412a are satisfied. For example, the context management system 102 can activate the unified recommendation sensor 412a in the search query sensor graph 310c in response to determining that 1) the search sensor 406 has generated a sensor output; 2) there is at least threshold amount of time between the current time and the timestamp associated with the unified recommendation sensor output 414c; and 3) that one or more of the query state sensor output 414d and the query typing sensor output 414e were updated the last time their associated sensors were activated. In response to determining that some or all of the constraints associated with the unified recommendation sensor 412a are satisfied, the context management system 102 can activate the unified recommendation sensor 412a to generate the unified recommendation sensor output 414c, as discussed above.

As further shown in FIG. 4A, the architecture of sensors in the sensor graph 310d (e.g., the event sensor graph) includes multiple sensors with complex dependency constraints. For example, as shown, the event sensor graph trigger 306d triggers multiple action sensors 408a, 408b. To illustrate, the context management system 102 simultaneously activates the user action sensor 408a, and the document action sensor 408b in response to detecting the event sensor graph trigger 306d. In one or more embodiments, the user action sensor 408a and the document action sensor 408b include one or more software modules, scripts, and/or instructions that filter an event stream associated with the digital content system application 110a into detected user-based actions (e.g., display element selections, mouse movements, keystroke inputs) and document-related actions (e.g., file open, file save, file close).

For example, the user action sensor 408a can generate a last interaction sensor output 414g that includes one or more filtered events that are indicative of user actions within the digital content system application 110a relative to an open file. To illustrate, the user action sensor 408a can generate the last interaction sensor output 414g to include an indication of a last tool applied to a digital canvas, a last brush stroke applied to the digital canvas, a last color correction applied to the digital canvas, and so forth. Additionally, the document action sensor 408b can generate a current document ID sensor output 414f that includes a document identifier (e.g., a file name, a pointer, a file location) associated with the file, document, or digital canvas with which the last interaction was detected.

As further shown in FIG. 4A, the event sensor graph 310d further includes multiple canvas sensors 410a, 410b, 410c, 410d, and 410e. As shown, each of the canvas sensors 410a-410e include at least one dependency constraint associated with the document action sensor 408b. In one or more embodiments, the context management system 102 can activate any of the canvas sensors 410a-410e in response to determining that this and other constraints associated with the canvas sensors 410a-410e are satisfied. For example, the context management system 102 can activate one or more of the canvas sensors 410a-410e sequentially or in parallel in order to generate the sensor outputs 414h, 414i, 414j, 414k, and 414l. Each of the canvas sensors 410a-410e will now be discussed in detail.

In one or more embodiments, the document classification canvas sensor 410a includes one or more software modules, scripts, and/or instructions that determine a classification associated with a particular document. For example, the document classification canvas sensor 410a can utilize the current document ID sensor output 414f, other sensor outputs, and other system information to determine a document classification associated with a currently active document. To illustrate, the document classification canvas sensor 410a can utilize sensor outputs and other information to determine that a document classification of a particular document is a "digital canvas," a "text document," a "digital photograph," and so forth. The context management system 102 can activate the document classification canvas sensor 410a to generate the document classification sensor output 414h.

In one or more embodiments, the face detection canvas sensor 410b includes one or more software modules, scripts, and/or instructions that detect one or more faces in a current document or digital canvas. For example, the face detection canvas sensor 410b can generate an input vector for a trained facial detection machine learning model in order to generate the faces sensor output 414i that includes a number and location of one or more faces in the current document. The context management system 102 activates the face detection canvas sensor 410b based, at least in part, on the current document ID sensor output 414f and/or the last interaction sensor output 414g including at least one trigger corresponding to the face detection canvas sensor 410b. For example, the at least one trigger can be a specific document-related action (e.g., opening the document, closing the document, adding a layer to the document, inserting a digital photograph into a layer).

In one or more embodiments, the defect detection canvas sensor 410c includes one or more software modules, scripts, and/or instructions that detects defects in the current document or digital canvas. For example, the defect detection canvas sensor 410c can generate an input vector for a trained defect detection machine learning model in order to generate the defects sensor output 414j that includes a listing of defects in the current document or digital canvas. For example, the defects sensor output 414j can include an indication of one or more defects with regard to colors (e.g., uneven color in an object, poor color choices), layer alignment (e.g., layers not positioned correctly), and skewed lines (e.g., lines not snapped to a grid, lines that do not meet up properly). The context management system 102 activates the defect detection canvas sensor 410c based, at least in part, on the current document ID sensor output 414f and/or the last interaction sensor output 414g including at least one trigger corresponding to the defect detection canvas sensor 410c. For example, the at least one trigger can be in response to an action that is specific to a particular document such as, but not limited to, opening the document, closing the document, adding a layer to the document, inserting a digital photograph into a layer.

In one or more embodiments, the object detection canvas sensor 410d includes one or more software modules, scripts, and/or instructions that detects objects in the current document or digital canvas. For example, the object detection canvas sensor 410d can generate an input vector for a trained object detection machine learning model in order to generate the objects sensor output 414k that includes a listing of objects and object locations in the current document or digital canvas. To illustrate, the objects sensor output 414k can include indications of one or more detected objects such as people, animals, cars, buildings, trees, and any other type of object, along with their relative locations in the current document or digital canvas. The context management system 102 activates the object detection canvas sensor 410d based, at least in part, on the current document ID sensor output 414f and/or the last interaction sensor output 414g including at least one trigger corresponding to the object detection canvas sensor 410d. For example, the at least one trigger can be a specific document-related action (e.g., opening the document, closing the document, adding a layer to the document, inserting a digital photograph into a layer).

In one or more embodiments, the content tag canvas sensor 410e includes one or more software modules, scripts, and/or instructions that generates tags for objects and other content in the current document or digital canvas. For example, the content tag canvas sensor 410e can generate an input vector for a trained object tagging machine learning model in order to generate the tags sensor output 414l that includes a listing of tagged objects in the current document. The context management system 102 activates the content tag canvas sensor 410e based, at least in part, on the current document ID sensor output 414f and/or the last interaction sensor output 414g including at least one trigger corresponding to the content tag canvas sensor 410e. For example, the at least one trigger can be a specific document-related action (e.g., opening the document, closing the document, adding a layer to the document, inserting a digital photograph into a layer).

As mentioned above, in at least one embodiment, the canvas sensors 410a-410e are computationally heavy. For example, one or more of the canvas sensors 410a-410e include various trained machine learning models that perform computer vision-type tasks. As such, one or more of the canvas sensors 410a-410e utilize extra processing cycles and memory units in order to apply various models to a digital canvas and/or media item in order to detect faces, tag objects, determine defects, and so forth. By imposing dependency, timing, and/or update constraints on the canvas sensors 410a-410e, the context management system 102 delays and/or avoids activating these sensors unnecessarily—thereby generating computational efficiencies and increasing the accuracy of the sensor outputs associated with the canvas sensors 410a-410e.

As further shown in FIG. 4A, the event sensor graph 310d further includes a user activity action sensor 408c, which includes dependency constraints associated with both the user action sensor 408a and the document action sensor 408b. For example, in one or more embodiments, the current document ID sensor output 414f and the last interaction sensor output 414g include one or more triggers associated with the dependency constraints between the user action sensor 408a and the user activity action sensor 408c, and the document action sensor 408b and the user activity action sensor 408c. In response to determining that the one or more triggers satisfy one or both of the dependency constraints (and other constraints), the context management system 102 can activate the user activity action sensor 408c. For instance, the user activity action sensor 408c can include one or more software modules, scripts, and/or instructions that determines or derives an activity classification (or activity class) associated with a current user activity based at least on one or more of the current document ID sensor output 414f and the last interaction sensor output 414g. To illustrate, if the current document ID sensor output 414f indicates the current document is a digital canvas including a digital photograph, and the last interaction sensor output 414g indicates that the user interaction with the digital photograph was the application of a set of preset color corrections, the user activity action sensor 408c can generate the user activity sensor output 414m indicating the activity classification is "digital photograph editing."

As further shown in FIG. 4A, the event sensor graph 310d further includes multiple recommendation sensors 412a, 412b, 412c. As shown, some of the recommendation sensors have single dependency constraints (e.g., as with the tool recommendation sensor 412b and the tutorial recommendation sensor 412c), while others have multiple dependency constraints (e.g., as with the unified recommendation sensor 412a). Each of the recommendation sensors 412a, 412b, and 412c will now be discussed in detail.

As discussed above, the context management system 102 activates the unified recommendation sensor 412a in the event sensor graph 310d in response to determining that one or more constraints associated with the unified recommendation sensor 412a have been satisfied. For example, the context management system 102 can determine that the dependency constraint between the unified recommendation sensor 412a and the user activity action sensor 408c is satisfied by determining that the user activity action sensor 408c has completed activation, has generated a sensor output (e.g., the user activity sensor output 414m), or that the generated sensor output includes a trigger corresponding to the dependency constraint between the user activity action sensor 408c and the unified recommendation sensor 412a.

As further shown, the unified recommendation sensor 412a in the event sensor graph 310d is subject to a second constraint between one or more of the canvas sensors 410a-410e. Thus, the context management system can determine that the dependency constraint between the unified recommendation sensor 412a and one or more of the canvas sensors 410a-410e is satisfied by determining that one or more of the one or more of the canvas sensors 410a-410e have completed activation, one or more of the canvas sensors 410a-410e have generated corresponding sensor outputs, or that one or more of the generated sensor outputs include a trigger corresponding to the dependency constraint between one or more of the canvas sensors 410a-410e and the unified recommendation sensor 412a.

In response to determining that the dependency constraints and other constraints (e.g., a timing constraint, an update constraint) associated with the unified recommendation sensor 412a in the event sensor graph 310d are satisfied, the context management system can activate the unified recommendation sensor 412a. For example, as discussed above, in response to being activated, the unified recommendation sensor 412a can generate an input vector based on one or more sensor outputs in the context store 114 (e.g., number of faces, number of objects, defects in a canvas, current action classification). The unified recommendation sensor 412a can then apply a trained recommendation machine learning model to the vector to generate the unified recommendation sensor output 414c. Additionally or alternatively, the unified recommendation sensor 412a can further analyze the output of the trained recommendation machine learning model in combination with yet additional sensor outputs in the context store 114 to accurately generate the unified recommendation sensor output 414c. Additionally or alternatively, the unified recommendation sensor 412a can generate the unified recommendation sensor output 414c based on a knowledge graph, predefined heuristics, and/or algorithms in connection with any combination of sensor outputs from the context store 114. As such, the unified recommendation sensor 412a generates recommendations that are accurate to the current context of the user of the client device 108 based on continually updated values in the context store 114.

In updating the context store 114 with the unified recommendation sensor output 414c, the context management system 102 may overwrite an existing value associated with the unified recommendation sensor output 414c. The context management system 102 may further update a timestamp associated with the unified recommendation sensor output 414c and change the update signal associated with the unified recommendation sensor output 414c to "true" based on whether the newly stored value is different from the previously stored value associated with the unified recommendation sensor output 414c.

The context management system 102 can further activate the tool recommendation sensor 412b in response to determining that one or more constraints associated with the tool recommendation sensor 412b are satisfied. For example, the context management system 102 can determine that the dependency constraint between the tool recommendation sensor 412b and the user action sensor 408a is satisfied by determining that the user action sensor 408a has completed activation, has generated a sensor output (e.g., the last interaction sensor output 414g), or that the generated sensor output includes a trigger corresponding to the dependency constraint between the user action sensor 408a and the tool recommendation sensor 412b.

In response to determining that this and other constraints (e.g., a timing constraint, an update constraint) associated with the tool recommendation sensor 412b are satisfied, the context management system can activate the tool recommendation sensor 412b. For example, in response to being activated the tool recommendation sensor 412b can generate an input vector based on one or more sensor outputs in the context store 114 for a trained tool recommendation machine learning model. The tool recommendation sensor 412b can then utilize the output of the trained tool recommendation machine learning model to generate the tool recommendation sensor output 414o. Additionally or alternatively, the tool recommendation sensor 412b can generate the tool recommendation sensor output 414o based on a knowledge graph, predefined heuristics, and/or algorithms.

In updating the context store 114 with the tool recommendation sensor output 414o, the context management system 102 may overwrite an existing value associated with the tool recommendation sensor output 414o. The context management system 102 may further update a timestamp associated with the tool recommendation sensor output 414o and change the update signal associated with the tool recommendation sensor output 414o to "true" based on whether the newly stored value is different from the previously stored value associated with the tool recommendation sensor output 414o.

The context management system 102 can further activate the tutorial recommendation sensor 412c in response to determining that one or more constraints associated with the tutorial recommendation sensor 412c are satisfied. For example, the context management system 102 can determine that the dependency constraint between the tutorial recommendation sensor 412c and the user activity action sensor 408c is satisfied by determining that the user activity action sensor 408c has completed activation, has generated a sensor output (e.g., the user activity sensor output 414m), or that the generated sensor output includes a trigger corresponding to the dependency constraint between the user activity action sensor 408c and the tutorial recommendation sensor 412c.

In response to determining that this and other constraints (e.g., a timing constraint, an update constraint) associated with the tutorial recommendation sensor 412c are satisfied, the context management system can activate the tutorial recommendation sensor 412c. For example, in response to being activated the tutorial recommendation sensor 412c can generate an input vector based on one or more sensor outputs in the context store 114 for a trained tutorial recommendation machine learning model. The tutorial recommendation sensor 412c can then utilize the output of the trained tutorial recommendation machine learning model to generate the tutorial recommendation sensor output 414n. Additionally or alternatively, the tutorial recommendation sensor 412c can generate the tutorial recommendation sensor output 414n based on a knowledge graph, predefined heuristics, and/or algorithms.

In updating the context store 114 with the tutorial recommendation sensor output 414n, the context management system 102 may overwrite an existing value associated with the tutorial recommendation sensor output 414n. The context management system 102 may further update a timestamp associated with the tutorial recommendation sensor output 414n and change the update signal associated with the tutorial recommendation sensor output 414n to "true" based on whether the newly stored value is different from the previously stored value associated with the tutorial recommendation sensor output 414n.

Although FIG. 4A illustrates a specific architecture (or configuration) of triggers, sensor graphs, and sensor outputs, the context management system 102 can utilize a variety of different architectures and/or configuration in connection with the context sensing framework 302. For example, the context sensing framework 302 can include a single trigger associated with a single sensor graph. Additionally or alternatively, the context sensing framework 302 can include any number of triggers associated with any number of sensor graphs. In at least one embodiment, the context sensing framework 302 can include multiple triggers associated with a single sensor graph, or a single trigger associated with multiple sensor graphs. Additionally, each sensor graph in the context sensing framework 302 can include any number of sensors, each with any number or type of constraints. Moreover, each sensor graph can be associated with any number of sensor outputs.

Figure 4B:
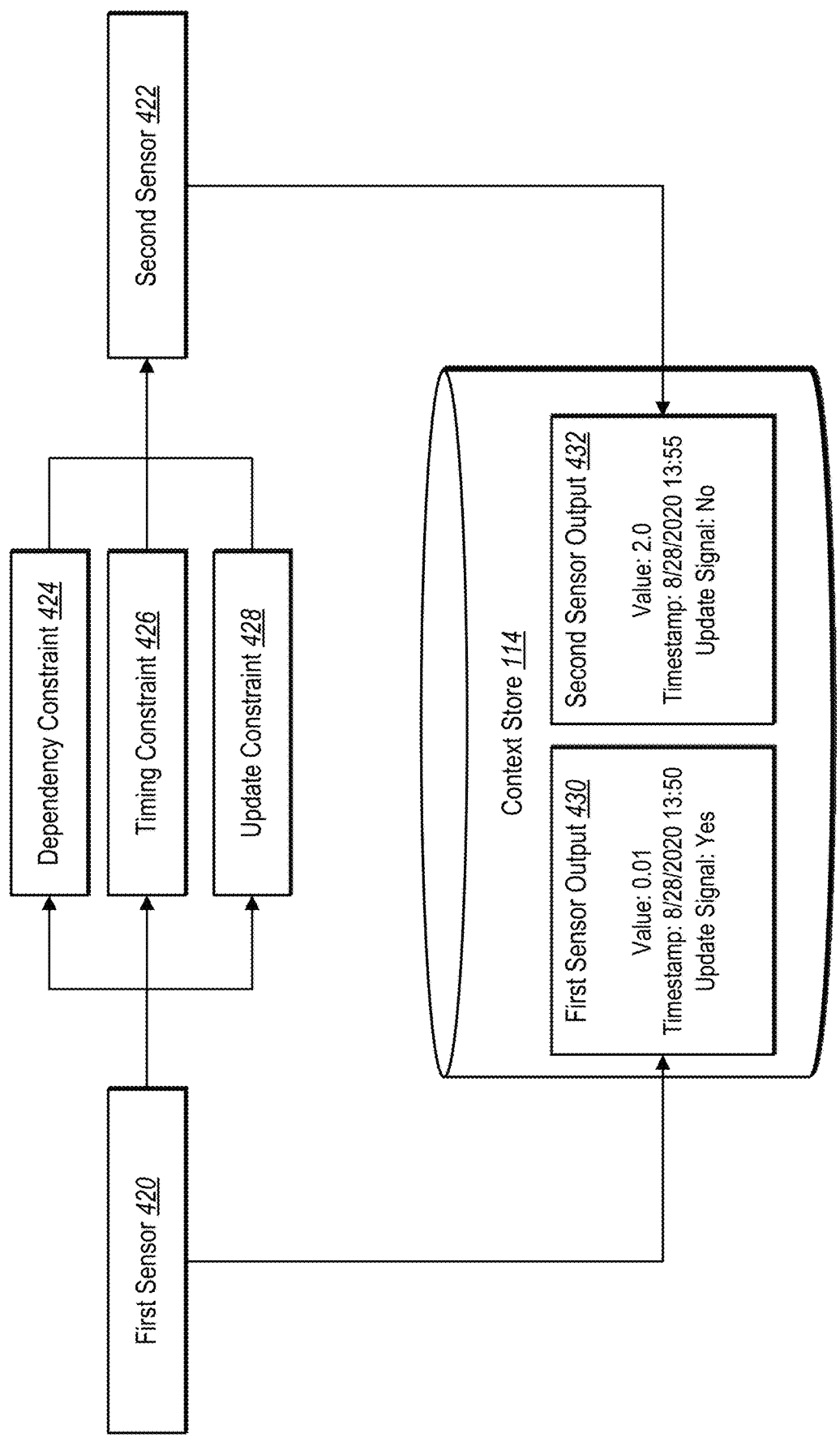

As mentioned above, FIG. 4B illustrates additional detail with regard to constraints with which one or more sensors may be associated. For example, as shown in FIG. 4B, the context management system 102 can activate a second sensor 422 based on determining that one or more constraints associated with the second sensor 422 are satisfied. For example, a sensor can include one or more operations, commands, scripts, or modules that function to generate a sensor output. In one or more embodiments, the context management system 102 activates the second sensor 422 to generate a second sensor output 432 in response to determining that one or more of a dependency constraint 424, a timing constraint 426, and/or an update constraint 428 associated with the second sensor 422 are satisfied.

In one or more embodiments, the context management system 102 determines that the dependency constraint 424 associated with the second sensor 422 is satisfied based at least in part on the first sensor 420. For example, the context management system 102 can determine that the dependency constraint 424 associated with the second sensor 422 is satisfied by determining one or more of: that the first sensor 420 has completed activation, that the first sensor 420 has generated a sensor output (e.g., the first sensor output 430), or that the first sensor output 430 generated by the first sensor 420 includes a trigger corresponding to the dependency constraint 424.

For example, the context management system 102 can determine that the first sensor 420 has completed activation in response to determining that the first sensor output 430 was recently updated, or in response to determining that none of the modules or scripts associated with the first sensor 420 are currently activated or running. Additionally, the context management system 102 can determine that the first sensor 420 has generated the first sensor output 430 by determining that the first sensor output 430 was recently updated.

Moreover, the context management system 102 can determine that the first sensor output 430 includes a trigger corresponding to the dependency constraint 424 by analyzing that the first sensor output 430 was recently generated or updated, and that the first sensor output 430 includes a trigger (e.g., a command, a script, an instruction) that instructs the context management system 102 to activate the second sensor 422. Additionally or alternatively, the context management system 102 can determine that the first sensor output 430 includes a trigger corresponding to the dependency constraint 424 based on dependency logic in a function associated with second sensor 422. For example, the second sensor 422 may have one or more rule-based functions that process and/or listen for one or more outputs or events associated with the first sensor 420. In response to determining that the one or more outputs or events associated with the first sensor 420 are present, correct, and/or expected (e.g., the outputs match a predetermined value and/or threshold), the dependency logic associated with the second sensor 422 can determine that the dependency constraint 424 is satisfied.

In one or more embodiments, the context management system 102 determines that the timing constraint 426 associated with the second sensor 422 is satisfied based on a timestamp associated with the second sensor output 432 stored in the context store 114. For example, in order to prevent too-frequent activation of the second sensor 422, the context management system 102 can perform a comparison of the current time and the historical timestamp associated with the second sensor output 432 in the context store 114. In at least one embodiment, the context management system 102 determines that the timing constraint 426 is satisfied by determining that difference between the current time and the historical timestamp (e.g., "8/28/2020 13:55") associated with the second sensor output 432 is equal to or greater than a threshold amount of time. Different timing constraints associated with different sensors can have different threshold amounts of time. For example, a computationally intensive sensor may have a timing constraint with a two-minute threshold amount of time, while a sensor that performs a simple algorithm may have a timing constraint with a fifteen-second threshold amount of time.

In one or more embodiments, the context management system 102 determines that the update constraint 428 is satisfied based on a previous activation of the previous first sensor 420. For example, analyzing same inputs may waste computing resources (in generating same outputs). Accordingly, the context management system 102 can determine the update constraint 428 is satisfied in response to determining that the most recently generated value associated with first sensor output 430 is different from a previously generated value associated with the first sensor output 430. In at least one embodiment, the context management system 102 performs this determination based on an update signal associated with the first sensor output 430.

To illustrate, each time the context management system 102 updates a particular sensor output in the context store 114, the context management system 102 can determine whether the current value associated with that sensor output is the same or different from an existing value associated with that sensor output. Based on that determination, the context management system 102 can maintain or change a value associated with the update signal for that sensor output.

For example, the update signal can be a Boolean value such as "true"/"false"; "1"/"0"; "yes"/"no"; or "changed"/"not changed." Accordingly, the update signal for the first sensor output 430 reflects whether the value associated with the first sensor output 430 changed the last time the corresponding first sensor 420 was activated. As shown in FIG. 4B, the update signal (e.g., "Yes") associated with the first sensor output 430 indicates that the value (e.g., "0.01") associated with the first sensor output 430 is different from a previous value associated with the first sensor output 430.

Thus, the context management system 102 can determine that the update constraint 428 associated with the second sensor 422 is satisfied by first identifying one or more previous sensors based on the dependency constraint 424, identifying the first sensor output 430 associated with the previous first sensor 420, and determining that the update signal associated with the first sensor output 430 indicates that the value associated with the first sensor output 430 changed the last time the first sensor 420 was activated.

By constraining the execution of one or more sensors of a sensor graph, the context management system 102 can produce stable and accurate sensor outputs for use in generating stable and accurate recommendations across applications. For example, conventional systems often encounter race-conditions where one software module relies on an output that has not been properly updated because it was either updated too long ago or not at all. The context management system 102 avoids these and other inaccuracies by utilizing structured sensor graphs of sensor that are subject to multiple constraints to ensure proper sensor execution.

Figure 5A:
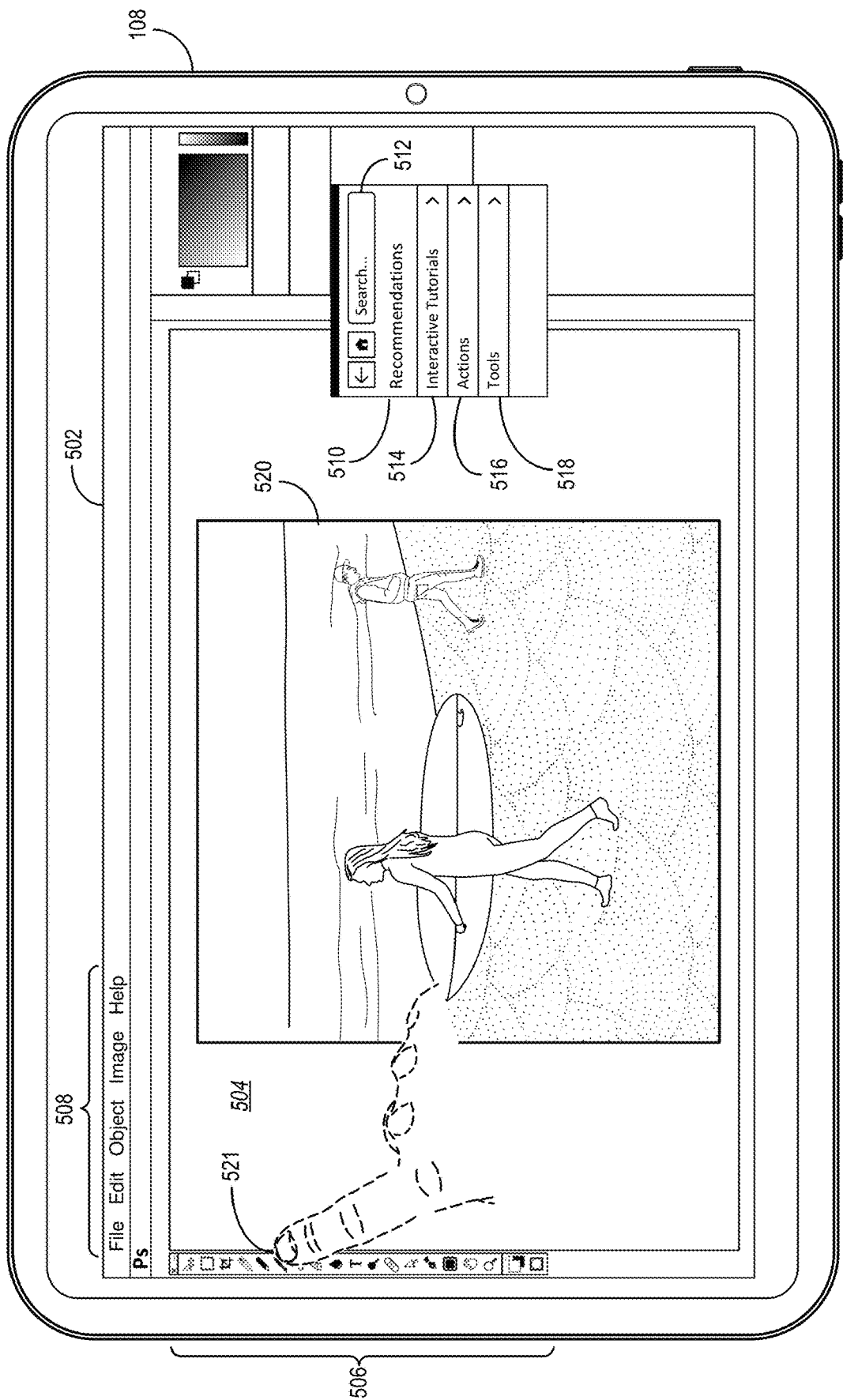
FIGS. 5A-5D illustrate graphical user interfaces for detecting digital activity and providing user-context based recommendations in accordance with one or more embodiments.
Figure 5B:
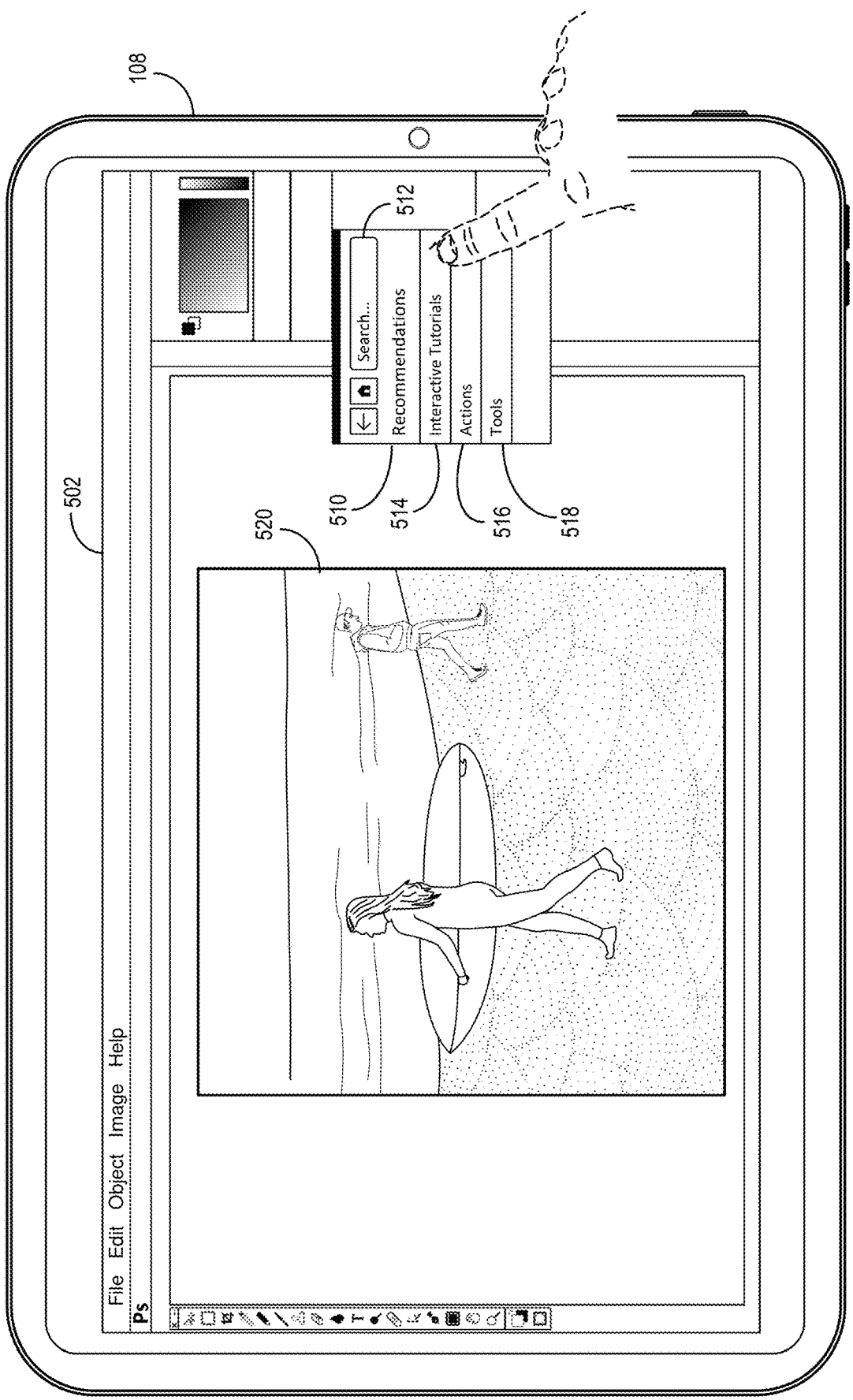

FIGS. 5A-5D illustrate additional details with regard to the context management system 102 providing one or more context-based digital recommendations in connection with a digital content system application 110a. For example, as shown in FIG. 5A, the digital content system application 110a can generate and provide the digital content system application interface 502 on the client device 108. The digital content system application 110a can generate the digital content system application interface 502 to include a workspace 504, editing tools 506, file options 508, and a recommendation tool 510.

As illustrated, the context management system 102 provides a recommendation tool 510 in the digital content system application interface 502. For example, the context management system 102 can generate the recommendation tool 510 to include a selectable search input box 512, a selectable tutorial element 514, a selectable quick actions element 516, and a selectable tools help element 518. In at last one embodiment, and as will be discussed in greater detail below, each of the selectable elements 512-518 correspond to different types of recommendations that the context management system 102 can generate and provide based on the user-context values associated with sensor outputs in the context store 114.

By interacting with one or more of the file options 508, the user of the client device 108 can select a file to open and edit. For example, in response to a detected selection of a particular file (e.g., a digital image), the digital content system application 110a can provide a digital canvas 520 including the selected file. In response to further detected user interactions with the editing tools 506 in connection with the digital canvas 520, the digital content system application 110a can enact one or more edits on the file within the digital canvas 520.

The context management system 102 can further monitor and detect user interactions within the digital content system application interface 502 to detect one or more triggering events. For example, in response to a detected selection of the brush tool 520, the context management system 102 can detect a triggering event corresponding to the event sensor graph trigger (e.g., the event sensor graph trigger 306d shown in FIG. 4A). The context management system 102 can further identify and activate one or more sensors of the event sensor graph (e.g., the event sensor graph 310d shown in FIG. 4A) associated with the event sensor graph trigger. The context management system 102 can then activate one or more sensors of the event sensor graph depending on whether constraints associated with the one or more sensors are satisfied. In this way, as discussed above with regard to FIG. 4A, the context management system 102 can activate one or more recommendation sensors (e.g., one or more of the recommendation sensors 412a-412c shown in FIG. 4A) to generate one or more recommendation sensor outputs (e.g., one or more of the recommendation sensor outputs 414c, 414n, 414o).

The context management system 102 can provide one or more recommendations via the recommendation tool 510 based on the one or more recommendation sensor outputs. For example, as shown in FIG. 5B, in response to a detected selection of the selectable tutorials element 514, the context management system 102 can generate one or more digital recommendations, each associated with tutorials that are relevant to the current context of the user of the client device 108 (e.g., based on the context-based values in the context store 114 generated as a result of the activation of the event sensor graph 310d). To illustrate, in response to the detected selection of the selectable tutorials element 514, the context management system 102 can identify values associated with one or more sensor outputs in the context store 114. The context management system 102 can then utilize the identified values to determine the user's current activity (e.g., applying the brush tool to the digital canvas 521), the classification of the digital image on the digital canvas 520, and the user's profile information. The context management system 102 can further identify one or more pre-generated tutorials that correspond with this information.

Figure 5C:
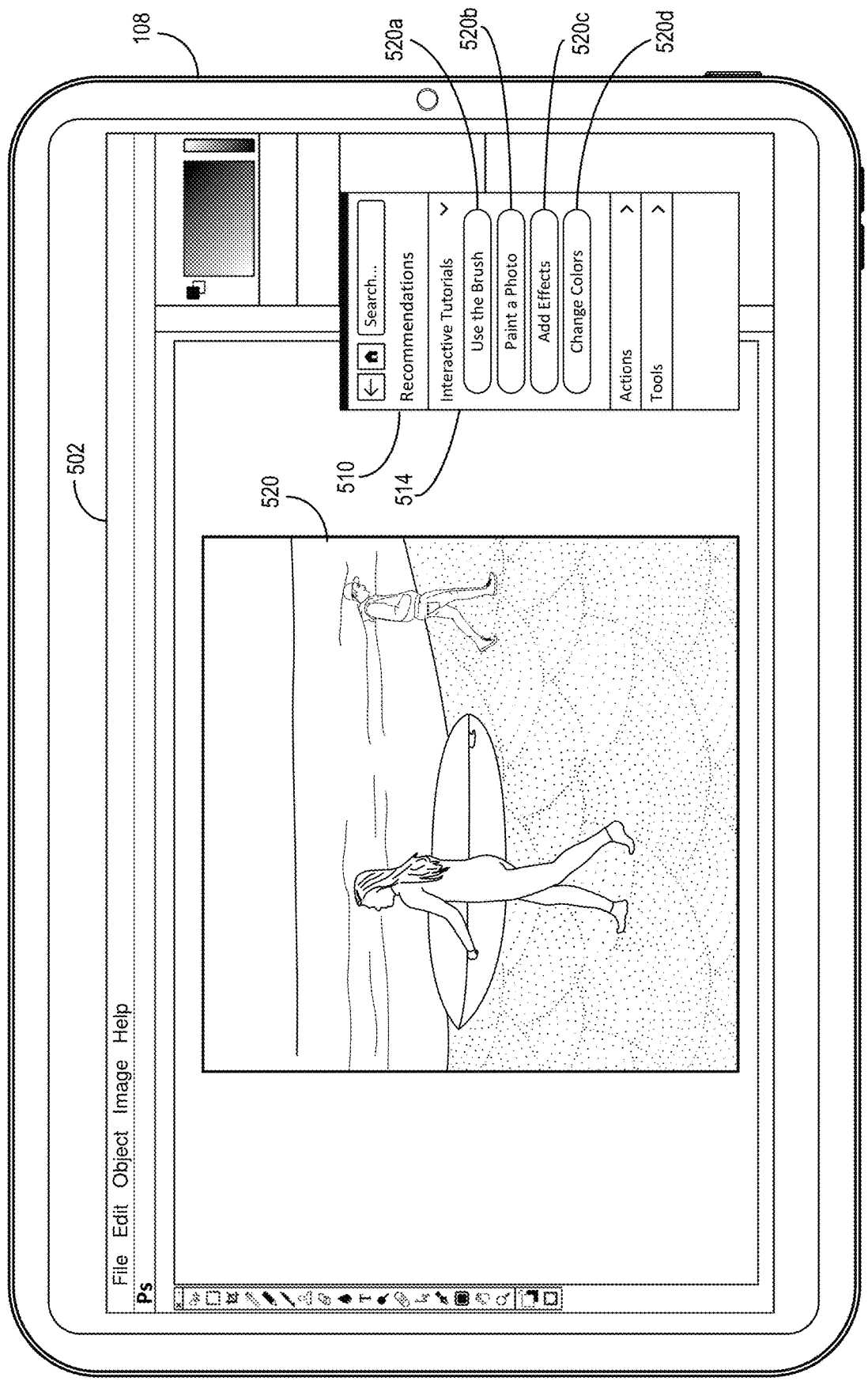

As further shown in FIG. 5C, in response to identifying one or more pre-generated tutorials, the context management system 102 can provide additional selectable elements 520a, 520b, 520c, 520d, each associated with one of the identified pre-generated tutorials. For example, in response to a detected selection of the selectable element 520a, the context management system 102 can provide a display of the pre-generated tutorial associated with the selectable element 520a.

Figure 5D:
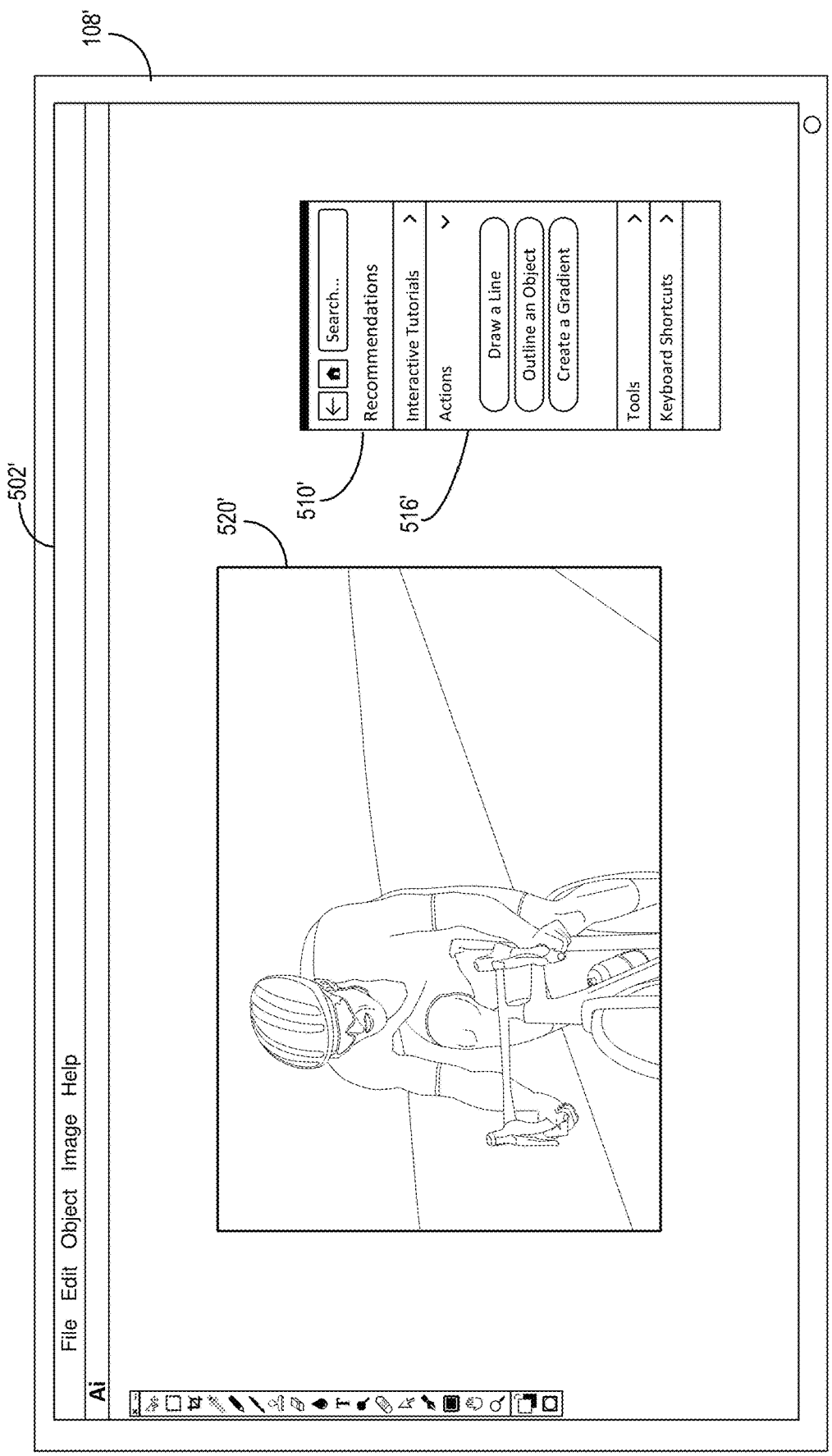

As further shown in FIG. 5D, the context management system 102 can further persist the context-based values in the context store 114 for use in connection with a different applications on the client device 108. For example as shown in FIG. 5D, the context management system 102 can utilize the context-based values in the context store 114 to generate recommendations in connection with a digital content system application interface 502' (e.g., associated with the digital content system application 110n) presented on a client device 108'. For example, both the digital content system application 110a (illustrated in FIGS. 5A-5C) and the digital content system application 110n may be associated with the same user account, such that the user can access those applications from any client device 108. As such, the client device 108 may be a smart phone or tablet, while the client device 108' illustrated in FIG. 5D may be a desktop or laptop computer.

As further shown in FIG. 5D, in response to a detected selection of recommendation tool 510', the context management system 102 can utilize the context-based values in the context store 114 to generate one or more recommendations in connection with the digital canvas 520'. For example, in response to a detected selection of the selectable quick actions element 516' in the recommendation tool 510', the context management system 102 can read one or more context-based values from the context store 114 to generate various quick-action options (e.g., "draw a line," "outline and object," "create a gradient"). In response to a detected selection of any of the options relative to the selectable quick actions element 516', the context management system 102 can either enact the selected change in connection with the digital canvas 520', or activate one or more modules of the digital content system 104 in connection with the digital canvas 520'.

In this way, the context management system 102 maintains and persists the context of the user of the client device 108 across applications and account-enabled devices. For example, the context management system 102 can intelligently sense the user's context in one application and provide recommendations based on that context in other recommendations. Accordingly, the context management system 102 provides a cohesive user experience where the user consistently receive recommendations across applications that are relevant to what the user is doing.

Although FIGS. 5A-5D illustrate the context management system 102 providing digital recommendations via a recommendation tool (e.g., the recommendation tool 510, 510'), the context management system 102 can also provide digital recommendations in other ways. For example, in additional or alternative embodiments, the context management system 102 can interactively provide digital recommendations in connections with various portions of user interfaces provided by a currently active application. To illustrate, in one embodiment, the context management system 102 can provide a popup window or suggestion bubble including a digital recommendation in response to detecting a user hover over a particular tool. In another embodiment, the context management system 102 can auto fill a search toolbar input text box with a digital recommendation in response to detecting a user selection of the search toolbar. In yet another embodiment, the context management system 102 can provide a popup window or suggestion bubble including a digital recommendation in response to detecting the opening or selection of a digital canvas.

Figure 6A:
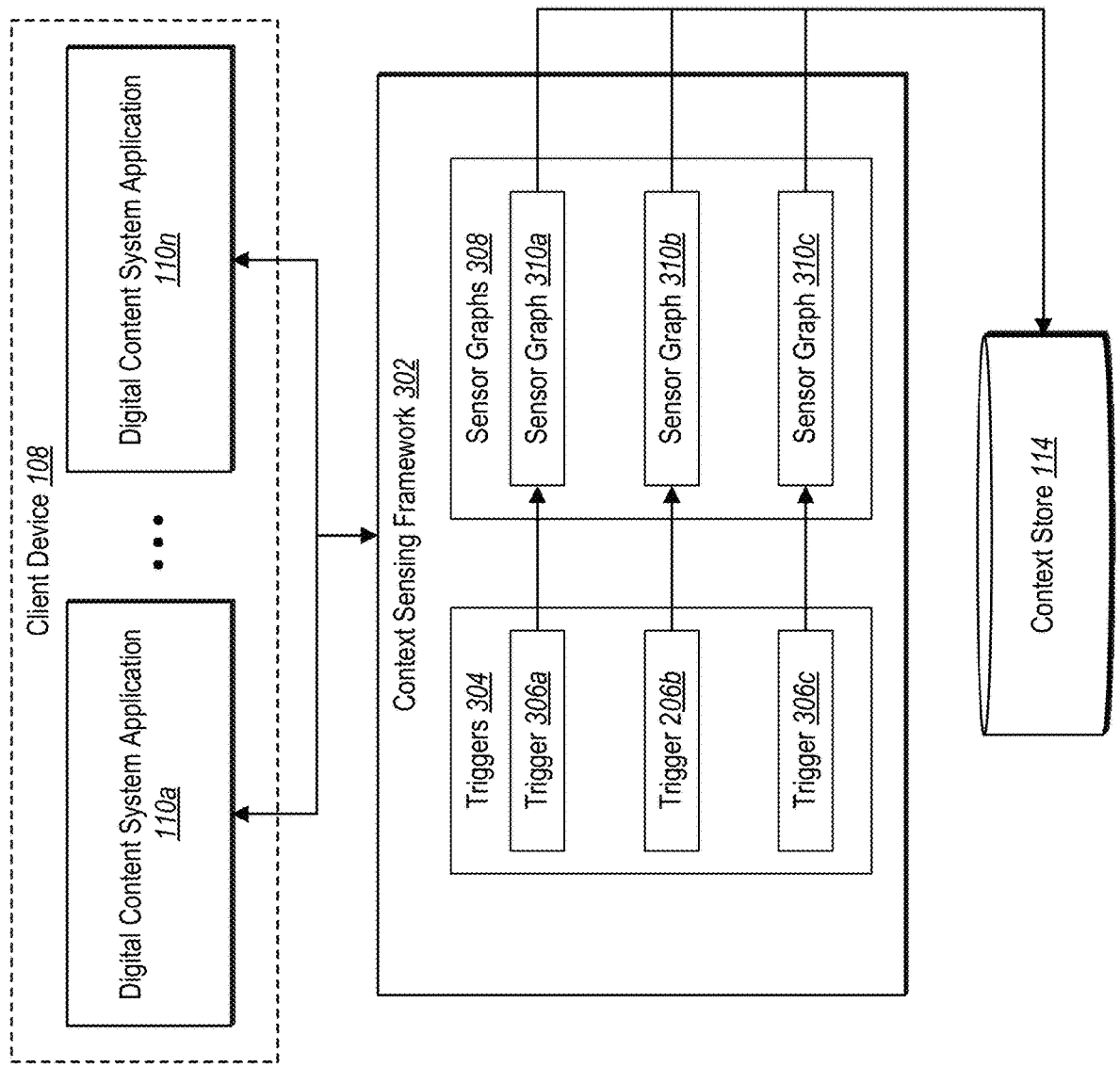
FIG. 6A illustrates a diagram of the context management system utilizing the context sensing framework in connection with multiple applications in accordance with one or more embodiments.

FIG. 6A illustrates additional detail with regard to how multiple applications on the client device 108 interact with and utilize the context sensing framework 302 (e.g., as described above with reference to FIG. 3). For example, although the context management system 102 is described above mainly in connection with the digital content system application 110a, the context management system 102 can further utilize the context sensing framework 302 in connection with multiple digital content system applications 110a-110n. In this way, the context management system 102 can generate recommendations for the digital content system application 110n based on sensor outputs generated in response to triggering events associated with a totally separate application (e.g., the digital content system application 110a). In one or more embodiments, the context management system 102 maintains a unified representation of a user's context across multiple applications on the client device 108.

To further illustrate, the context management system 102 can detect one or more triggering events relative to the digital content system application 110a that correspond to the sensor graph trigger 306a in the context sensing framework 302. The context management system 102 can then identify the sensor graph 310a that corresponds to the sensor graph trigger 306a and activate a first sensor in the sensor graph 310a. The context management system 102 can further activate other sensors in the sensor graph 310a depending on whether dependencies associated with the other sensors are satisfied in order to generate one or more sensor outputs. The context management system 102 can then update the context store 114 with the generated sensor outputs.

Additionally, the context management system 102 can detect one or more triggering events relative to the digital content system application 110n that correspond to the sensor graph trigger 306b in the context sensing framework 302. The context management system 102 can then identify the sensor graph 310b that corresponds to the sensor graph trigger 306b and activate one or more sensors of the sensor graph 310b depending on dependencies, as discussed above. In at least one embodiment, the one or more sensors of the sensor graph 310b utilize sensor outputs in the context store 114 that were generated by one or more sensors of the sensor graph 310a. The one or more sensors of the sensor graph 310b can further generate additional sensor outputs that the context management system 102 utilizes to update the context store 114. For example, a sensor of the sensor graph 310b may generate a unified recommendation sensor output (e.g., the unified recommendation sensor output 414c shown in FIG. 4A), and the context management system 102 can update the context store 114 by overwriting an existing value associated with that sensor output with the newly generated value. One or more modules of the digital content system application 110a may then access the updated unified recommendation sensor output in the context store 114 to generate a recommendation within the digital content system application 110a.

Thus, the context management system 102 utilizes, maintains, and activates the sensor graphs of the context sensing framework 302 in order to update the context store 114 with user context values (e.g., sensor outputs) that can be utilized by any of multiple digital content systems applications 110a-110n in order to generate seamlessly cohesive, user context-based recommendations even if the user switches from one application to another. Although the context management system 102 is described in connection with digital content systems applications 110a-110n, in additional or alternative embodiments, the context management system 102 can utilize the context sensing framework 302 in connection with multiple applications that are not tied to a central system (e.g., the digital content system 104). For example, in one embodiment, the context management system 102 can utilize the context sensing framework 302 in connection with a web browser application and an image editing application so that a user's web browsing activity can affect the user's context-based recommendations in the image editing application.

Figure 6B:
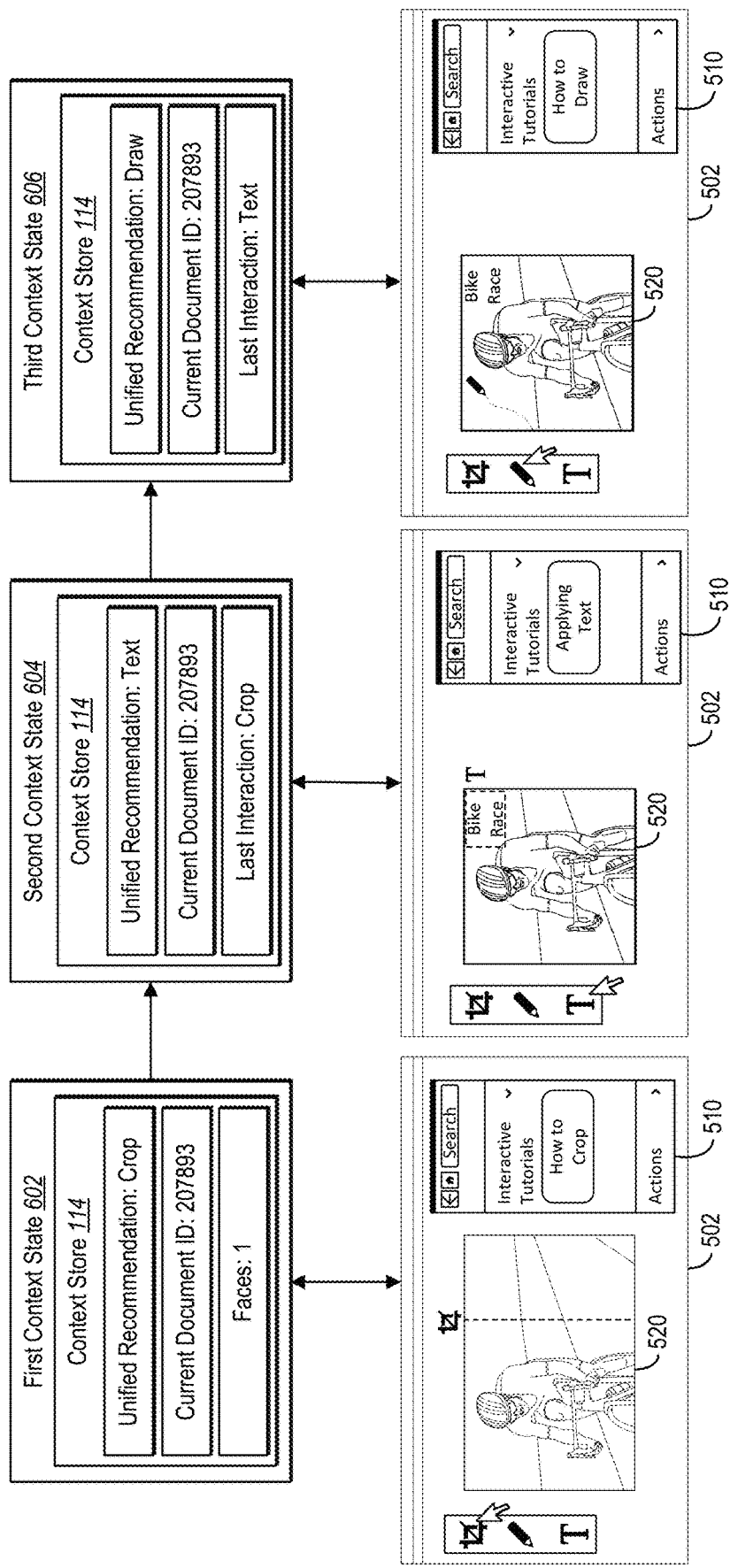
FIG. 6B illustrates a diagram of the context management system determining and storing context states associated with an application in accordance with one or more embodiments.

FIG. 6B illustrates the context management system 102 determining one or more context states associated with an image editing application. As mentioned above, the context management system 102 can enable contextual navigation within one or more digital content system applications 110a-110n by determining and storing context states associated with the context store 114. Thus, in response to detecting a navigation event such as a selection of a "back" button or an "undo" button, the context management system 102 can generate one or more digital recommendations that are accurate to (and consistent with) the user's previous context as indicated by the stored context state associated with the context store 114.

As shown in FIG. 6B, the context management system 102 can determine a first context state 602 associated with the context store 114 in response to detecting one or more user events in connection with the digital content system application interface 502 of the digital content system application 110a. For example, in response to detecting a user selection of a new editing tool (e.g., a crop tool) in connection with the digital canvas 520, the context management system 102 can generate the first context state 602. Similarly, in response to detecting additional selections of new editing tools (e.g., the text tool and the draw tool), the context management system 102 can generate the second context state 604 and the third context state 606, respectively.

In additional or alternative embodiments, the context management system 102 can generate a context state (e.g., the context states 602-606) in response to various context state triggers. As discussed above, the context management system 102 can generate a context state in response to a detected user selection. In additional or alternative embodiments, the context management system 102 can determine a context state in response to determining that a tool has been applied to the digital canvas 520. In additional or alternative embodiments, the context management system 102 can determine a context state in response to determining that a predefined amount of time has passed since a previous context state was determined (e.g., 60 seconds). Additionally or alternatively, the context management system 102 can determine a context state in response to determining that no user interactions have been detected in connection with the digital content system application interface 502 for a threshold amount of time (e.g., 60 seconds). Additionally or alternatively, the context management system 102 can determine a context state in response to determining that a value associated with a sensor output in the context store 114 has changed.

In one or more embodiments, the context management system 102 determines a context state (e.g., the context states 602-606) in various ways. For example, in one embodiment, the context management system 102 determines a context state by creating a full copy of the context store 114 including all the sensor outputs and their corresponding values. In an additional or alternative embodiment, the context management system 102 can determine a context state by storing only the sensor output values that have changed.

As mentioned above, the context management system 102 can store context states as they are determined. For example, the context management system 102 can store the context states in an first-in-last-out manner such that a retrieved context state is the most recently added context state. Thus, in response to a navigation event such as a "back" button selection, the context management system 102 can retrieve the most recent context state associated with the digital content system application 110*a*.

After determining and storing at least one context state, the context management system 102 can enable contextual navigation in connection with the digital content system application 110*a*. For example, after determining and storing the third context state 606, the context management system 102 may detect a navigation event associated with the digital content system application 110*a* indicating a backward navigation event (e.g., a selection of an "undo" button, or a "back" button). In response to the detected navigation event, the context management system 102 can retrieve the stored third context state 606. The context management system 102 can further generate one or more digital recommendations (e.g., in connection with the recommendation tool 510) based on sensor outputs included in the context store within the third context state 606. In response to further navigation events (e.g., additional selections of an "undo" button or "back" button), the context management system 102 can retrieve the second context state 604 followed by the first context state 602, and generate further digital recommendations based on sensor outputs associated with those context states.

In addition, the content management system 102 can also retrieve context states moving in a forward direction. For example, if the context management system 102 navigates back to the first context state 602, and then receives user interaction with a "forward" button (e.g., a navigation event moving forward), the context management system 102 can rectrive the second context state 604. Moreover, the context management system 102 can generate user interface elements and recommendations utilizing the second context state 604 to provide consistent user interface elements while navigating through the different context states.

Figure 7:
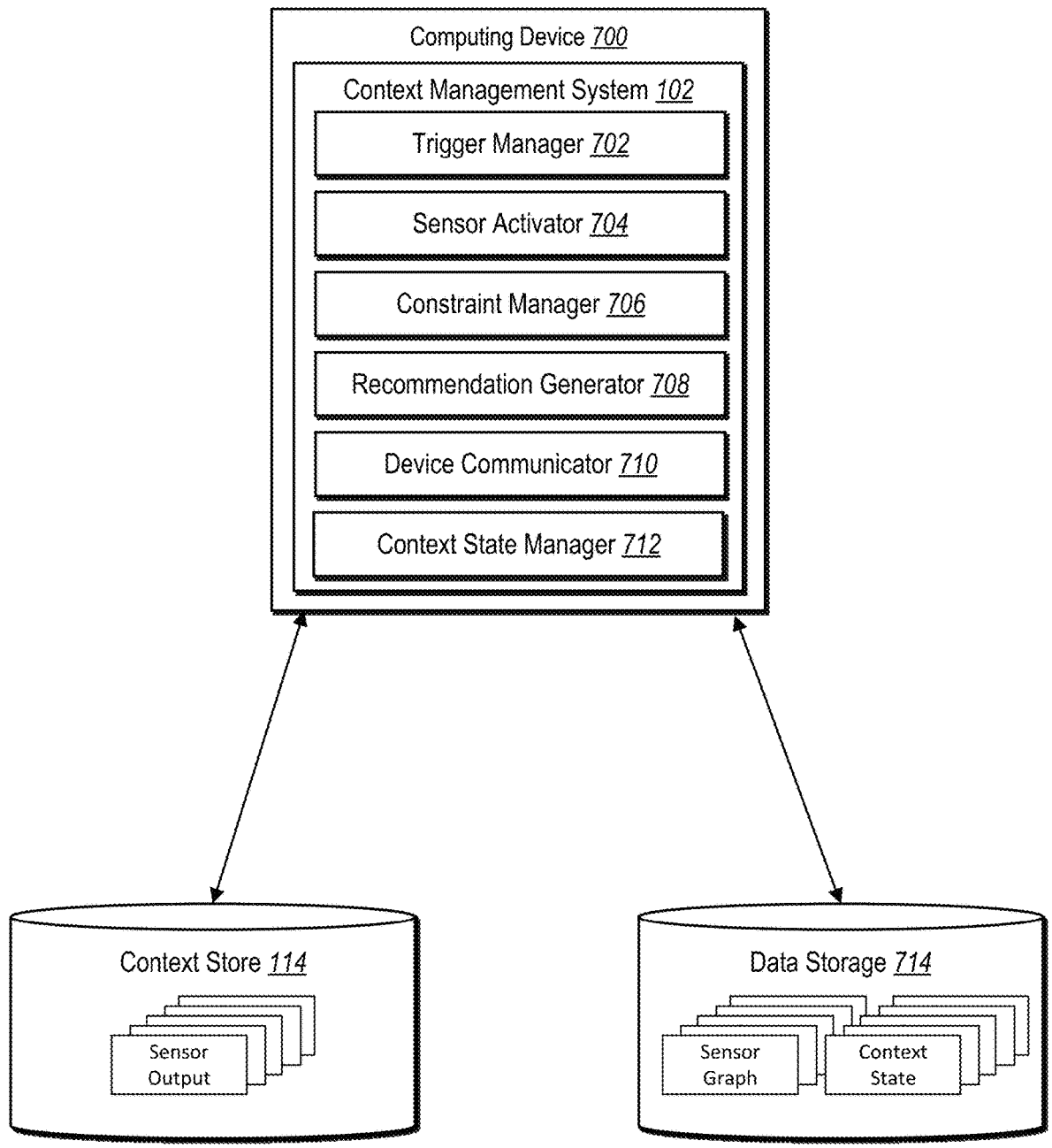
FIG. 7 illustrates a schematic diagram of the context management system in accordance with one or more embodiments.

As described above in relation to FIGS. 1-6B, the context management system 102 performs operations for generating context-based digital recommendations across one or more applications. FIG. 7 illustrates a detailed schematic diagram of an embodiment of the context management system 102 described above. Although illustrated on a computing device 700, the context management system 102 can be implemented by one or more different or additional computing devices. For example, the computing device 700 can include the server(s) 106. Additionally or alternatively, the computing device 700 can include the client device 108. In one or more embodiments, the context management system 102 includes a trigger manager 702, a sensor activator 704, a constraint manager 706, a recommendation generator 708, a device communicator 710, and a context state manager 712.

As mentioned above, and as shown in FIG. 7, the context management system 102 includes the trigger manager 702. In one or more embodiments, the trigger manager 702 monitors digital activity of a client device with respect to one or more client device applications to detect one or more triggering events. For example, the trigger manager 702 can monitor user interactions with the digital content system application 110*a* to detect one or more triggering events. Similarly, the trigger manager 702 can monitor application actions associated with the digital content system application 110*a* such as opening a file or closing a file.

In response to detecting one or more triggering events, the trigger manager 702 can determine one or more sensor graph triggers that correspond to the one or more triggering events. For example, the trigger manager 702 can determine whether a triggering event meets a predetermined requirement or threshold associated with a particular sensor graph trigger. In response to determining that a detected triggering event satisfies a particular sensor graph trigger, the trigger manager 702 can further identify and load a sensor graph associated with the sensor graph trigger. For example, the trigger manager 702 can identify the corresponding sensor graph from a collection of sensor graphs based on an indication (e.g., a file name, a file location, a pointer) associated with the sensor graph trigger. In at least one embodiment, the trigger manager 702 further loads the sensors of the identified sensor graph such that the sensors are ready to be activated.

As mentioned above, and as shown in FIG. 7, the context management system 102 also includes the sensor activator 704. In one or more embodiments, the sensor activator 704 activates, initializes, or otherwise executes one or more sensors of a loaded sensor graph. For example, in response to the trigger manager 702 identifying and loading a particular sensor graph, the sensor activator 704 can activate or execute a first sensor of the sensor graph. Depending on constraints associated with additional sensors in the sensor graph (e.g., determined by the constraint manager 706 discussed below), the sensor activator 704 can activate one or more additional sensors in the sensor graph. In at least one embodiment, the sensor activator 704 activates a sensor by executing a script, a software module, or other instructions represented by the sensor.

As mentioned above, and as shown in FIG. 7, the context management system 102 includes the constraint manager 706. In one or more embodiments, the constraint manager 706 determines whether one or more constraints associated with a sensor are satisfied such that the sensor activator 704 can activate the sensor. For example, the constraint manager 706 can determine whether a dependency constraint associated with a sensor is satisfied by determining at least one of 1) one or more previous sensors have completed activation; 2) one or more previous sensors have generated sensor outputs; or 3) that one or more of the generated sensor outputs include a trigger corresponding to the dependency constraint between the sensor and at least one of the previous sensors.

Additionally, the constraint manager 706 can determine whether a timing constraint associated with the sensor is satisfied by determining that at least a threshold amount of time has passed since the last time the sensor was activated. For example, the constraint manager 706 can determine whether a sensor output associated with the sensor exists in the context store 114. If an associated sensor output exists, the constraint manager 706 can identify a timestamp associated with the associated sensor output. The constraint manager 706 can then determine a time difference between the identified timestamp and the current time. If the time difference is equal to or greater than a predetermined threshold amount of time, the constraint manager 706 can determine that the timing constraint associated with the sensor is satisfied.

Moreover, the constraint manager 706 can determine whether an update constraint associated with the sensor is satisfied by determining that the sensor output associated with the sensor was updated to a new value in the most recent execution of the sensor. For example, as discussed above, each time the context management system 102 updates the context store 114 with a new sensor output, the context management system 102 can determine whether the value of the new sensor output is different from the value of the existing sensor output in the context store 114. If the new value is different from the existing value associated with the sensor output, the context management system 102 can change the update signal associated with the sensor output in the context store 114 to reflect the value change by changing the update signal to "yes," "true," "1," "changed," or similar. If the new value is the same as the existing value associated with the sensor output, the context management system 102 can change the update signal associated with the sensor output in the context store 114 to reflect that the value is unchanged by changing the updated value to "no," "false," "0," "unchanged," or similar. Accordingly, the constraint manager 706 can determine whether the update constraint associated with the sensor is satisfied by identifying the change value associated with the sensor output corresponding to the sensor and determining that the change value indicates that the sensor output was updated in the most recent execution of the sensor (e.g., by determining that the identified change value is "yes," "true," "1," or "changed").

As mentioned above, and as shown in FIG. 7, the context management system 102 includes the recommendation generator 708. In one or more embodiments, the recommendation generator 708 utilizes one or more sensor outputs to identify and provide one or more recommendations via one or more applications on the client device 108. For example, the recommendation generator 708 can utilize one or more sensor output values to identify one or more of suggested search terms, suggested help topics, suggested tutorials, and/or suggested quick-actions. The recommendation generator 708 can further update a recommendation tool within one or more applications on the client device 108 to include selectable display elements associated with the identified suggested search terms, suggested help topics, suggested tutorials, and/or suggested quick-actions. In response to a detected selection of any of these display elements, the recommendation generator 708 can provide a display of the associated suggested search term, suggested help topic, suggested tutorial, and/or suggested quick-action.

As mentioned above, and as shown in FIG. 7, the context management system 102 includes the device communicator 710. In one or more embodiments, the device communicator 710 handles communication tasks in connection with other devices (e.g., the server(s) 106 and the client device 108). For example, the device communicator 710 can communicate with the server(s) to receive digital media items (e.g., digital photographs, vector-based images), updated tutorials, and quick actions.

As mentioned above, and as shown in FIG. 7, the context management system 102 includes the context state manager 712. In one or more embodiments, the context state manager 712 determines a context state associated with a digital content system application in response to a detected context state trigger. For example, the context state manager 712 can determine a context state in response to detecting a particular user action (e.g., a tool selection, a tool application), and/or in response to determining that a threshold amount of time has passed since a last context state was stored, or since the last detected user action in connection with the digital content system application, or that a value associated with a sensor output in the context store 114 has changed. The context state manager 712 can determine a context state by generating a copy of part or all of the context store 114 at a given point in time (e.g., the point in time at which a trigger was detected). The context state manager 712 can store context states in the data storage 714 in a first-in-last-out manner so as to facilitate contextual navigation within the digital content system application.

As further shown in FIG. 7, the context management system 102 stores and retrieves sensor outputs to and from the context store 114. In one or more embodiments, the context management system 102 stores and retrieves sensor outputs to and from the context store 114 by writing, overwriting, or reading sensor output values, timestamps, and update signals. Additionally, the context management system 102 can access a data storage 714 to identify and utilize one or more sensor graphs and/or context states.

Each of the components 702-714 and 114 of the context management system 102 can include software, hardware, or both. For example, the components 702-714 and 114 can include one or more instructions stored on a computer-readable storage medium and executable by processors of one or more computing devices, such as a client device or server device. When executed by the one or more processors, the computer-executable instructions of the context management system 102 can cause the computing device(s) to perform the methods described herein. Alternatively, the components 702-714 and 114 can include hardware, such as a special-purpose processing device to perform a certain function or group of functions. Alternatively, the components 702-714 and 114 of the context management system 102 can include a combination of computer-executable instructions and hardware.

Furthermore, the components 702-714 and 114 of the context management system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-714 and 114 may be implemented as a stand-alone application, such as a desktop or mobile application. Furthermore, the components 702-710 may be implemented as one or more web-based applications hosted on a remote server. The components 702-710 may also be implemented in a suite of mobile device applications or "apps." To illustrate, the components 702-710 may be implemented in an application, including but not limited to ADOBE CREATIVE CLOUD, such as ADOBE PHOTOSHOP, ADOBE INDESIGN, ADOBE PREMIER PRO, ADOBE ILLUSTRATOR, ADOBE XD, and ADOBE DC. "ADOBE", "CREATIVE CLOUD", "PHOTOSHOP", "INDESIGN", "PREMIER PRO", "ILLUSTRATOR", "XD," and "DC" are either registered trademarks or trademarks of Adobe Systems Incorporated in the United States and/or other countries.

Figure 8:
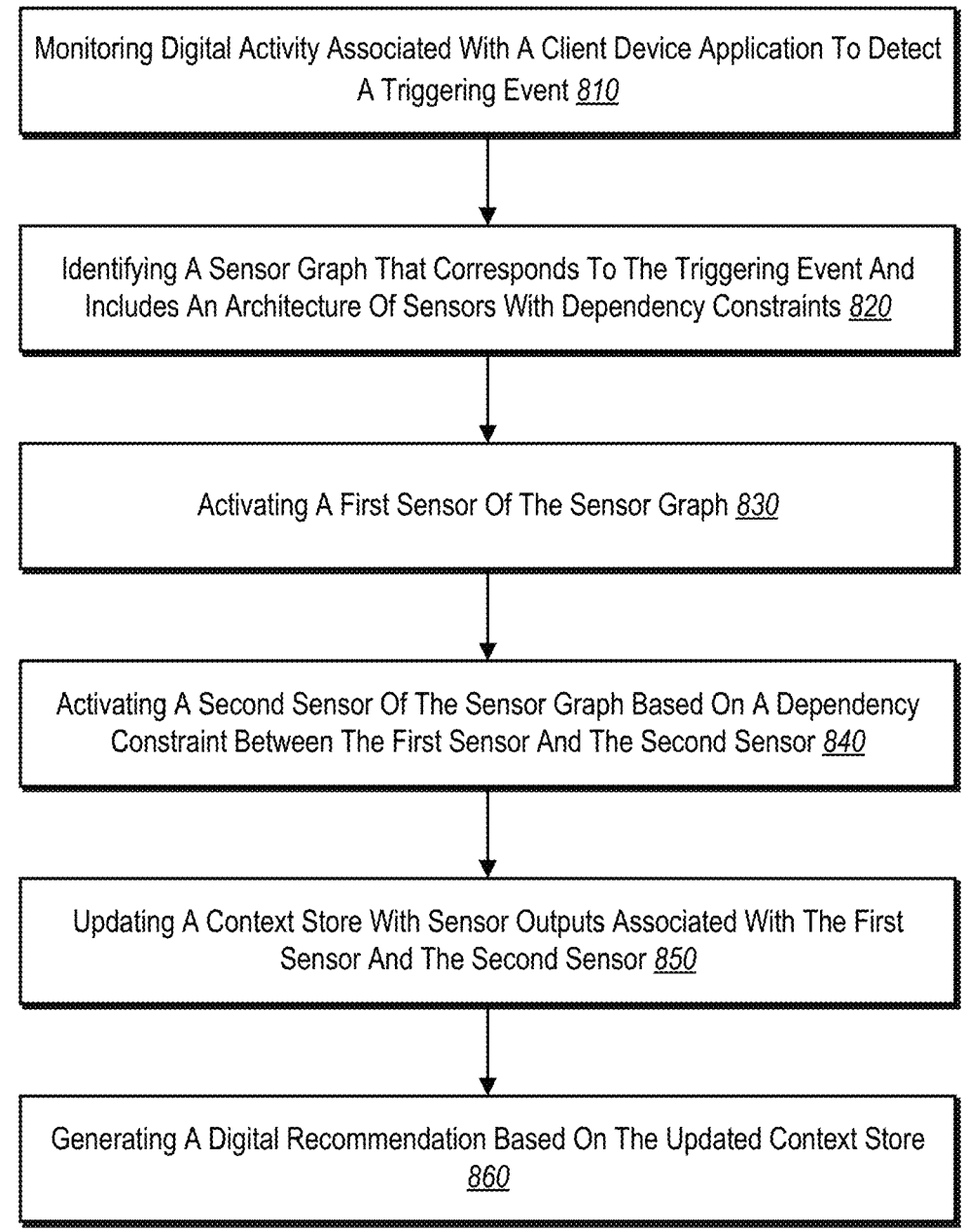
FIG. 8 illustrates a flowchart of a series of acts for generating a context-based digital recommendation in accordance with one or more embodiments.
Figure 10:
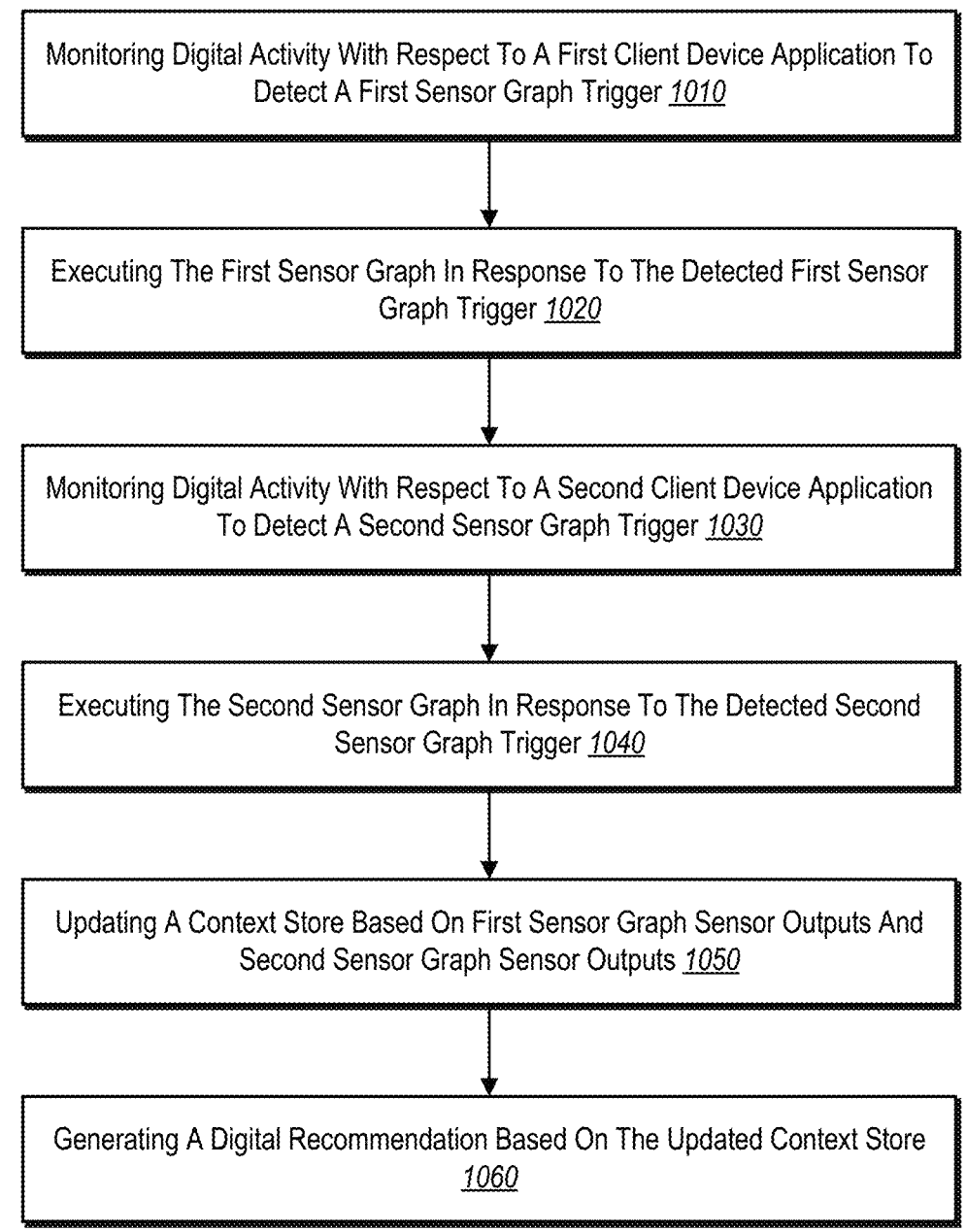
FIG. 10 illustrates a flowchart of a series of acts for generating a context-based digital recommendation based on context signals across multiple applications in accordance with one or more embodiments.

FIGS. 1-7, the corresponding text, and the examples provide a number of different methods, systems, devices, and non-transitory computer-readable media of the context management system 102. In addition to the foregoing, one or more embodiments can also be described in terms of flowcharts comprising acts for accomplishing a particular result, as shown in FIGS. 8, 9, and 10. FIGS. 8, 9, and 10 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts 800 for generating a context-based digital recommendation in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 810 of monitoring digital activity associated with a client device application to detect a triggering event. For example, the act 810 can involve monitoring digital activity of a client device with respect to a first client device application to detect a first triggering event corresponding to a first sensor graph trigger. In one or more embodiments, monitoring digital activity of the client device to detect the triggering event includes detecting at least one of: startup of the client device application, a state change within the client device application, a search query within the client device application, or a user event within the client device application.

As shown in FIG. 8, the series of acts 800 includes an act 820 of identifying a sensor graph that corresponds to the triggering event and includes an architecture of sensors with dependency constraints. For example, the act 820 can involve identifying a first sensor graph associated with the first sensor graph trigger from a plurality of sensor graphs, wherein the first sensor graph comprises a first architecture of sensors organized according to one or more dependency constraints.

As shown in FIG. 8, the series of acts 800 includes an act 830 of activating a first sensor of the sensor graph. For example, the act 830 can involve activating a first sensor of the sensors of the first sensor graph to generate a first sensor output corresponding to the client device. In one or more embodiments, activating the first sensor includes at least one of: activating an action sensor that determines a user activity classification or a digital document activity state corresponding to the client device application, activating a canvas sensor that determines information corresponding to a digital canvas of the client device application, or activating a recommendation sensor that generates one or more context-based recommendations corresponding to the client device application.

As shown in FIG. 8, the series of acts 800 includes an act 840 of activating a second sensor of the sensor graph based on a dependency constraint between the first sensor and the second sensor. For example, the act 840 can involve, in response to generating the first sensor output, activating a second sensor of the sensors of the first sensor graph based on a dependency constraint between the first sensor and the second sensor to generate a second sensor output corresponding to the client device. In one or more embodiments, activating the second sensor based on the dependency constraint between the first sensor and the second sensor can include determining one of the following: that the first sensor has completed activation, that the first sensor has generated the first sensor output prior to activating the second sensor, or that the first sensor output comprises a trigger corresponding to the dependency constraint. In at least one embodiment, the second sensor is further activated based on an update constraint associated with the first sensor that indicates the first sensor output of the first sensor was updated to a new value in a most recent execution of the first sensor. Additionally, in at least one embodiment, the second sensor is further activated based on a timing constraint that indicates at least a threshold amount of time has passed since the last time the second sensor was activated.

In one or more embodiments, the series of acts 800 includes in response to generating the second sensor output, activating a third sensor of the sensors of the first sensor graph based on a dependency constraint between the second sensor and the third sensor to generate a third sensor output corresponding to the client device; updating the context store utilizing the third sensor output; and generating the digital recommendation for the client device based on the updated context store including the third sensor output.

As shown in FIG. 8, the series of acts 800 includes an act 850 of updating a context store with sensor outputs associated with the first sensor and the second sensor. For example, the act 850 can involve updating a context store utilizing the first sensor output and the second sensor output.

As shown in FIG. 8, the series of acts 800 includes an act 860 of generating a digital recommendation based on the updated context store. For example, the act 860 can involve generating a digital recommendation for the client device based on the updated context store. In one or more embodiments, generating the digital recommendation for the client device includes: identifying the first sensor output and the second sensor output from the updated context store; and providing, for display to the client device based on the first sensor output and the second sensor output, one or more of a suggested search term, a suggested help topic, a suggested tutorial, or a suggested quick-action.

In one or more embodiments, the series of acts 800 further includes acts of: monitoring the digital activity of the client device with respect to the first client device application to detect a second triggering event corresponding to a second sensor graph trigger, and identifying a second sensor graph associated with the second sensor graph trigger from the plurality of sensor graphs, wherein the second sensor graph comprises a second architecture of sensors organized according to one or more dependency constraints. The series of acts 800 can further include: activating a sensor of the sensors of the second sensor graph to generate a second sensor graph sensor output; and updating the context store utilizing the second sensor graph sensor output.

In one or more embodiments, the series of acts 800 further includes acts of: monitoring additional digital activity of the client device with respect to a second client device application to detect a triggering event correspond to a third sensor graph trigger; and identifying a third sensor graph associated with the third sensor graph trigger from the plurality of sensor graphs, wherein the third sensor graph comprises a third architecture of sensors organized according to one or more dependency constraints. The series of acts 800 can further include activating a sensor of the third sensor graph to generate a third sensor output corresponding to the client device; and updating the context store utilizing the third sensor output.

In one or more embodiments, the series of acts 800 further includes an act of determining a a first context state associated with the first client device application, wherein the context state comprises one or more of the first sensor output and the second sensor output. The series of acts 800 can further include: monitoring additional digital activity of the client device with respect to the first client application to detect an additional triggering event corresponding to the first sensor graph trigger; activating the first sensor of the sensors of the first sensor graph to generate an updated first sensor output corresponding to the client device; updating the context store utilizing the updated first sensor output and determine a second context state; and upon updating the context store, in response to a navigational event, generating a digital recommendation for the client device based on the first context state.

As mentioned, FIG. 9 illustrates a flowchart of a series of acts 900 for generating a context-based digital recommendation in connection with an image editing application in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown in FIG. 9, the series of acts 900 includes an act 910 of identifying digital activity associated with an image editing application to detect a triggering event. For example, the act 910 can involve identifying digital activity of a client device corresponding to an image editing application comprising a digital canvas, wherein the digital activity satisfies a sensor graph trigger.

As shown in FIG. 9, the series of acts 900 includes an act 920 of identifying a sensor graph that corresponds to the triggering event and includes an architecture of sensors with dependency constraint. For example, the act 920 can involve identifying a sensor graph associated with the sensor graph trigger from a plurality of sensor graphs, wherein the sensor graph comprises an architecture of sensors organized according to one or more dependency constraints.

As shown in FIG. 9, the series of acts 900 includes an act 930 of activating an action sensor of the sensor graph. For example, the act 930 can involve activating an action sensor of the sensors of the sensor graph to generate an action sensor output comprising a user action associated with the image editing application. In one or more embodiments, activating the action sensor can include determining a current document identifier in connection with the image editing application, determining a last user interaction in connection with the image editing application, or determining a current user activity associated with the image editing application.

As shown in FIG. 9, the series of acts 900 includes an act 940 of activating a canvas sensor of the sensor graph based on a dependency constraint between the action sensor and the canvas sensor. For example, the act 940 can involve, based on the action sensor output and a dependency constraint between the action sensor and a first canvas sensor, activating the first canvas sensor of the sensors of the sensor graph to generate a first canvas sensor output corresponding to the digital canvas. In one or more embodiments, activating the first canvas sensor can include executing one or more machine learning models in connection with the digital canvas to perform one or more of document classification, facial recognition, defect detection, object detection, or content tagging. In at least one embodiment, the canvas sensor is further activated based on determining that: the dependency constraint between the action sensor and the first canvas sensor is satisfied, a timing constraint associated with the first canvas sensor is satisfied, and an update constraint associated with the action sensor is satisfied.

In at least one embodiment, the series of acts 900 further includes acts of: based on the action sensor output and a dependency constraint between the action sensor and a second canvas sensor, activating the second canvas sensor in parallel with activation of the first canvas sensor to generate a second canvas sensor output corresponding to the digital canvas; updating the context store utilizing the second canvas sensor output; and generating the digital recommendation based on the updated context store including the second canvas sensor output.

As shown in FIG. 9, the series of acts 900 includes an act 950 of updating a context store with sensor outputs associated with the action sensor and the canvas sensor. For example, the act 950 can involve updating a context store utilizing the action sensor output and the first canvas sensor output.

As shown in FIG. 9, the series of acts 900 includes an act 960 of generating a digital recommendation based on the updated context store. For example, the act 960 can involve generating a digital recommendation based on the updated context store. In at least one embodiment, the series of acts 900 includes an act of activating a recommendation sensor based on a dependency constraint between the recommendation sensor and the first canvas sensor. In that embodiment, generating the digital recommendation is in response to activation of the recommendation sensor.

In one or more embodiments, the series of acts 900 includes acts of: identifying additional digital activity of the client device corresponding to the image editing application comprising the digital canvas, wherein the additional digital activity satisfies an additional sensor graph trigger; and identifying an additional sensor graph associated with the additional sensor graph trigger from the plurality of sensor graphs, wherein the additional sensor graph comprises a profile sensor. The series of acts 900 further includes: activating the profile sensor of the additional sensor graph to generate a profile sensor output comprising profile information associated with a user of the image editing application; and updating the context store utilizing the profile sensor output.

As mentioned, FIG. 10 illustrates a flowchart of a series of acts 1000 for generating a context-based digital recommendation based on context signals across multiple applications in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As shown in FIG. 10, the series of acts 1000 includes an act 1010 of monitoring digital activity with respect to a first client device application to detect a first sensor graph trigger. For example, the act 1010 can involve monitoring digital activity of a client device with respect to a first client device application to detect a triggering event corresponding to a first sensor graph trigger.

As shown in FIG. 10, the series of acts 1000 includes an act 1020 of executing the first sensor graph in response to the detected first sensor graph trigger. For example, the act 1020 can involve executing a first sensor graph associated with the first sensor graph trigger from a plurality of sensor graphs according to dependency constraints between sensors of the first sensor graph to generate a set of first sensor graph sensor outputs. In one or more embodiments, executing the first sensor graph to generate the set of first sensor graph sensor outputs is further based on one or more of: determining that a threshold amount of time has passed since generating one or more first sensor graph sensor outputs, or determining that a sensor graph sensor output from the set of first sensor graph sensor outputs is different than one or more sensor graph sensor outputs from a previous time.

As shown in FIG. 10, the series of acts 1000 includes an act 1030 of monitoring digital activity with respect to a second client device application to detect a second sensor graph trigger. For example, the act 1030 can involve monitoring digital activity of the client device with respect to a second client device application to detect a triggering event corresponding to a second sensor graph trigger.

As shown in FIG. 10, the series of acts 1000 includes an act 1040 of executing the second sensor graph in response to the detected second sensor graph trigger. For example, the act 1040 can involve executing a second sensor graph associated with the second sensor graph trigger from the plurality of sensor graphs to generate a set of second sensor graph sensor outputs.

As shown in FIG. 10, the series of acts 1000 includes an act 1050 of updating a context store based on first sensor graph sensor outputs and second sensor graph sensor outputs. For example, the act 1050 can involve updating a context store utilizing the set of first sensor graph sensor outputs and the set of second sensor graph sensor outputs.

As shown in FIG. 10, the series of acts 1000 includes an act 1060 of generating a digital recommendation based on the updated context store. For example, the act 1060 can involve generating a digital recommendation for the client device based on the updated context store.

In one or more embodiments, the series of acts 1000 further includes acts of: detecting updated digital activity of the client device with respect to the first client device application to detect an updated triggering event corresponding to the first sensor graph trigger; executing the first sensor graph according to the dependency constraints to generate an additional set of first sensor graph sensor outputs; and updating the context store utilizing the additional set of first sensor graph sensor outputs.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
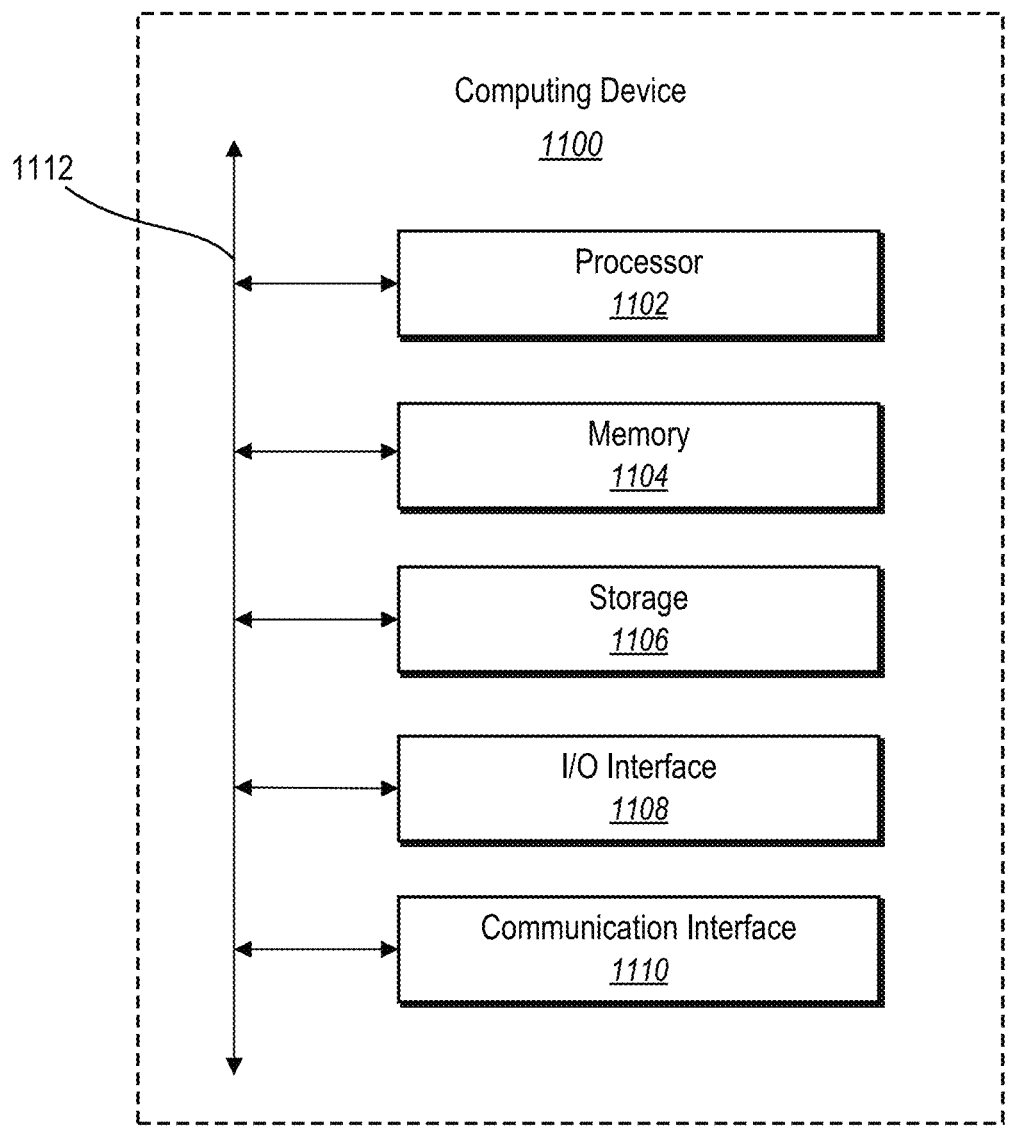
FIG. 11 illustrates a block diagram of an example computing device for implementing one or more embodiments of the present disclosure.

FIG. 11 illustrates a block diagram of an example computing device 1100 that may be configured to perform one or more of the processes described above. One will appreciate that one or more computing devices, such as the computing device 1100 may represent the computing devices described above (e.g., the server(s) 106, the client device 108). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   monitoring user activity with a client device application to detect a triggering event from the user activity that corresponds to a sensor graph trigger;
   determining a context state of the client device application based on the user activity by identifying a sensor graph associated with the sensor graph trigger, the sensor graph having an architecture of sensors organized according to one or more dependency constraints;
   generating and providing, via the client device application, a recommendation for one or more features of the client device application based on the context state;
   identifying additional user activity with respect to the client device application;
   determining an updated context state of the client device application based on the additional user activity and the context state; and
   generating and providing, via the client device application, an additional recommendation for one or more additional features of the first client device application based on the updated context state.

2. The computer-implemented method of claim 1, wherein monitoring the user activity with the client device application to detect the triggering event from the user activity comprises monitoring the user activity with the client device application to detect a startup of the client device application.

3. The computer-implemented method of claim 1, wherein monitoring the user activity with the client device application to detect the triggering event from the user activity comprises monitoring the user activity with the client device application to detect a search query within the client device application.

4. The computer-implemented method of claim 1, wherein determining the context state further comprises activating a plurality of sensors of the sensor graph to determine the context state.

5. The computer-implemented method of claim 1, wherein,
   generating and providing the recommendation comprises providing, for display via the client device application, one or more of a suggested search term, a suggested help topic, a suggested tutorial, or a suggested quick-action, and
   generating and providing the additional recommendation comprises providing, for display via the client device application, one or more of an additional suggested search term, an additional suggested help topic, an addition suggested tutorial, or an additional suggested quick-action.

6. The computer-implemented method of claim 1, wherein identifying the additional user activity with respect to the client device application further comprises detecting an additional triggering event corresponding to an additional sensor graph trigger.

7. The computer-implemented method of claim 6, wherein determining the updated context state comprises:
   identifying an additional sensor graph associated with the additional sensor graph trigger; and
   activating a plurality of sensors of the additional sensor graph to determine the updated context state.

8. A system comprising:
   one or more memory devices; and
   one or more processors coupled to the one or more memory devices that cause the system to perform operations comprising:
      monitoring user activity with a client device application to detect a triggering event from the user activity that corresponds to a sensor graph trigger;
      determining a context state of the client device application based on the user activity by identifying a sensor graph associated with the sensor graph trigger, the sensor graph having an architecture of sensors organized according to one or more dependency constraints;
      generating a recommendation for one or more features the client device application based on the context state;
      identifying additional user activity with respect to the client device application to detect an additional triggering event corresponding to an additional sensor graph trigger;
      determining an updated context state of the client device application based on an additional sensor graph corresponding to the additional sensor graph trigger and the context state determined from the sensor graph triggered by the user activity with the client device application; and generating, based on the updated context state, an additional recommendation for one or more additional features of the client device application that differ from the one or more features previously recommended.

9. The system of claim 8, wherein determining the context state further comprises selecting the sensor graph associated with the sensor graph trigger from a plurality of sensor graphs.

10. The system of claim 8, wherein determining the context state further comprises activating a plurality of sensors of the sensor graph to determine the context state.

11. The system of claim 8, wherein the one or more processors cause the system to perform operations comprising:
   providing the recommendation for the one or more features of the client device application for display via a client device user interface based on the context state; and
   providing the additional recommendation for the one or more additional features of the client device application for display via the client device user interface based on the updated context state.

12. The system of claim 11, wherein providing the recommendation comprises providing, for display via the client device user interface, one or more of a suggested search term, a suggested help topic, a suggested tutorial, or a suggested quick-action.

13. The system of claim 8, wherein determining the updated context state comprises activating a plurality of sensors of the additional sensor graph to determine the updated context state.

14. A non-transitory computer-readable medium storing instructions thereon that, when executed by at least one processor, cause the at least one processor to perform operations comprising:
   monitoring user activity with a client device application to detect a triggering event from the user activity that corresponds to a sensor graph trigger;
   determining a context state of the client device application based on the user activity by identifying a sensor graph associated with the sensor graph trigger, the sensor graph having an architecture of sensors organized according to one or more dependency constraints;
   generating and providing, via the client device application, a recommendation for one or more features of the client device application based on the context state;
   identifying additional user activity with respect to the client device application;
   determining an updated context state of the client device application based on the additional user activity and the context state; and
   generating and providing, via the client device application, an additional recommendation for one or more additional features of the client device application that differ from the one or more features previously recommended based on the updated context state.

15. The non-transitory computer-readable medium of claim 14, wherein monitoring the user activity with the client device application to detect the triggering event from the user activity comprises monitoring the user activity with the client device application to detect a startup of the client device application.

16. The non-transitory computer-readable medium of claim 14, wherein monitoring the user activity with the client device application to detect the triggering event from the user activity comprises monitoring the user activity with the client device application to detect a search query within the client device application.

17. The non-transitory computer-readable medium of claim 14, wherein determining the context state further comprises activating a plurality of sensors of the sensor graph to determine the context state.

18. The non-transitory computer-readable medium of claim 14, wherein:
   generating and providing the recommendation comprises providing, for display via the client device application, one or more of a suggested search term, a suggested help topic, a suggested tutorial, or a suggested quick-action, and
   generating and providing the additional recommendation comprises providing, for display via the client device application, one or more of an additional suggested search term, an additional suggested help topic, an addition suggested tutorial, or an additional suggested quick-action.

19. The non-transitory computer-readable medium of claim 14, wherein identifying the additional user activity with respect to the client device application further comprises detecting an additional triggering event corresponding to an additional sensor graph trigger.

20. The non-transitory computer-readable medium of claim 19, wherein determining the updated context state comprises:
   identifying an additional sensor graph associated with the additional sensor graph trigger; and
   activating a plurality of sensors of the additional sensor graph to determine the updated context state.

\* \* \* \* \*